United States Patent [19]
Koga et al.

[11] Patent Number: 6,043,922
[45] Date of Patent: Mar. 28, 2000

[54] OPTICAL RECEIVER BOARD, OPTICAL WAVELENGTH-TUNING FILTER MODULE USED FOR OPTICAL RECEIVER BOARD, AND ACTUATOR FOR OPTICAL WAVELENGTH-TUNING FILTER MODULE

[75] Inventors: Tadashi Koga; Takaaki Ogata, both of Tokyo; Hitoshi Oguri; Takashi Nakamura, both of Chiba, all of Japan

[73] Assignees: NEC Corporation; Sumitomo Osaka Cement Co., Ltd., both of Tokyo, Japan

[21] Appl. No.: 08/868,260

[22] Filed: Jun. 3, 1997

[30] Foreign Application Priority Data

| Jun. 3, 1996 | [JP] | Japan | 8-140491 |
| Jun. 3, 1996 | [JP] | Japan | 8-140547 |
| Jun. 3, 1996 | [JP] | Japan | 8-140548 |

[51] Int. Cl.[7] .................................................. H04B 10/06
[52] U.S. Cl. .......................... 359/193; 359/199; 359/578; 359/589
[58] Field of Search .................................. 359/193, 182, 359/199, 200, 578, 589; 385/25

[56] References Cited

U.S. PATENT DOCUMENTS

| 4,502,752 | 3/1985 | Montagu | 359/199 |
| 5,287,214 | 2/1994 | Robertson et al. | 359/578 |
| 5,361,155 | 11/1994 | Chiaroni et al. | 359/182 |
| 5,436,760 | 7/1995 | Nakabayashi | 359/589 |
| 5,481,402 | 1/1996 | Cheng et al. | 359/578 |
| 5,506,920 | 4/1996 | Suemura et al. | 385/25 |
| 5,548,437 | 8/1996 | Yoshimoto et al. | 359/200 |
| 5,781,332 | 7/1998 | Ogata | 359/578 |
| 5,781,341 | 7/1998 | Lee | 359/578 |

*Primary Examiner*—Jeffery A. Hofsass
*Assistant Examiner*—John Tweel, Jr.
*Attorney, Agent, or Firm*—Sughrue, Mion, Zinn Macpeak & Seas, PLLC

[57] ABSTRACT

An optical receiver board wherein, a signal light is amplified in an optical fiber amplifier. The amplified signal light is supplied to an electrically driven optical wavelength-tuning filter such as a multi-layered film interference filter, through which a signal light of a predetermined wavelength bandwidth is transmitted. The transmitted signal light is divided into first and second signal lights. The first signal light is converted to an electric signal which is amplified by an equalizing amplifier, and an amplified electric signal is supplied to a discrimination circuit, in which an information electric signal is generated by using a timing signal. The optical wavelength-tuning filter comprises a rotation actuator having a magnet-rotating portion and control coils, and an optical filter member fixed to the top of the magnet-rotating portion. In operation, the wavelength-tuning filter is swept by a sweep signal, so that an electric signal converted from a signal light transmitted through the optical wavelength-tuning filter becomes a predetermined value, and the tracking control is carried out to maximize power of the transmitted signal light. The inclination angle of the optical filter member is changed by controlling currents flowing through the control coils of the actuator, so that a transmission center wavelength of the signal light is adjusted.

20 Claims, 23 Drawing Sheets

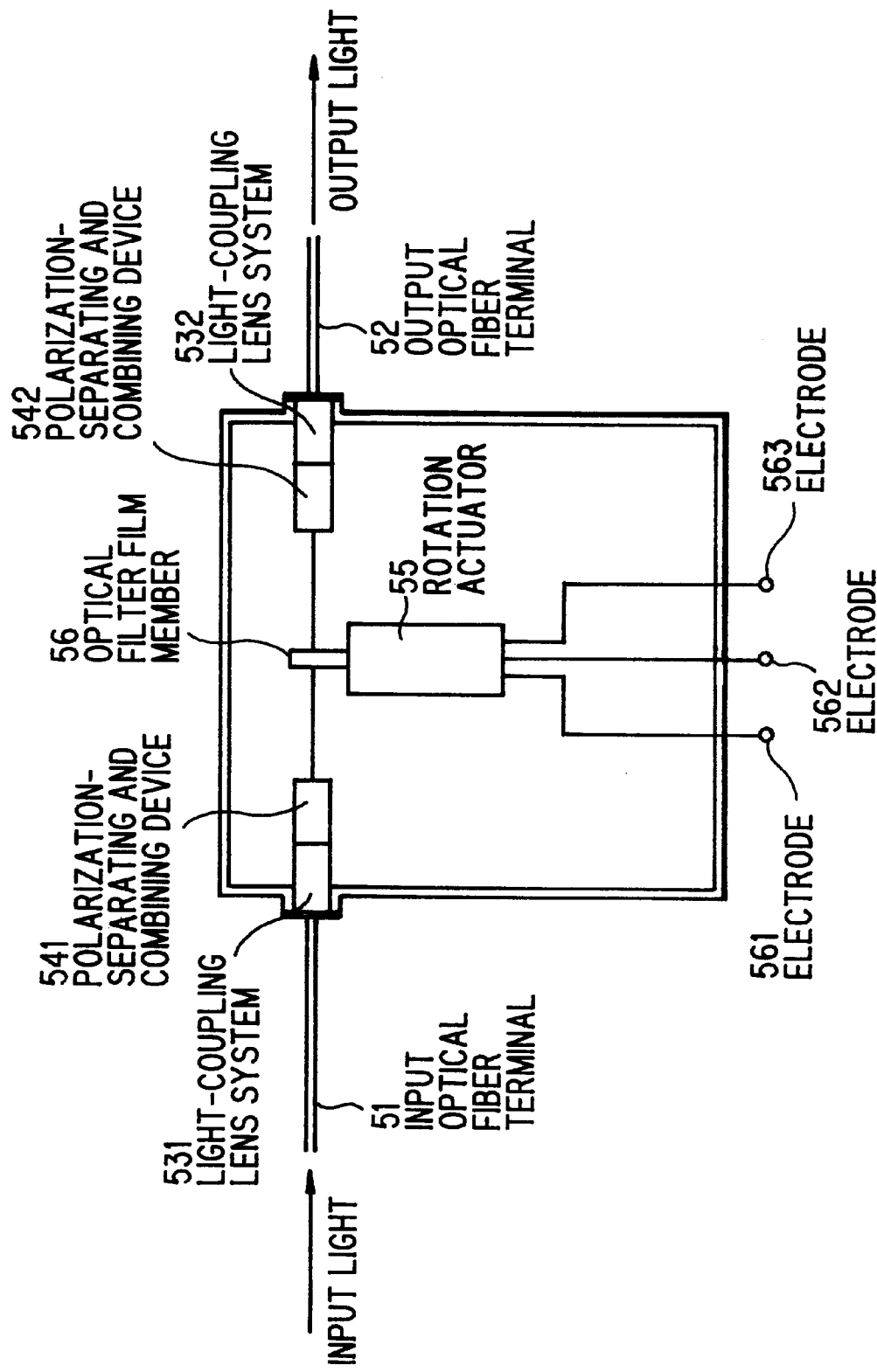

$V_B = V_{B0}(V)$
$V_C = 0(V)$ $V_B = V_{B0}(V)$
$V_C = V_{C0}(V)$

OPTICAL RECEIVER BOARD, OPTICAL WAVELENGTH-TUNING FILTER MODULE USED FOR OPTICAL RECEIVER BOARD, AND ACTUATOR FOR OPTICAL WAVELENGTH-TUNING FILTER MODULE

FIELD OF THE INVENTION

The invention relates to an optical receiver board, an optical wavelength-tuning filter module used for the optical receiver board, and an actuator for the optical wavelength-tuning filter module, and more particularly to, an optical receiver board which is improved in regard to sensitivity, selectivity of wavelengths, and reliability in long term use, an optical wavelength-tuning optical filter module which is improved in regard to polarization dependent loss to be used for the optical receiver board, and an actuator which is improved in regard to size, driving voltage, reliability, and durability to be used for the optical wavelength-tuning filter module.

BACKGROUND OF THE INVENTION

A first conventional optical receiver board comprises an optical amplifier for amplifying an input signal light of a wavelength $\lambda_0$, an optical bandpass filter having a transmission center wavelength $\lambda_0$, for transmitting the signal light, a photodiode for converting the signal light to an electric signal, an equalizing amplifier for amplifying the electric signal, a timing sample circuit for sampling a timing signal from an amplified electric signal, and a discrimination circuit for waveform-shaping the amplified electric signal in accordance with the timing signal to provide an information electric signal.

In the first conventional optical receiver board, the input signal light is amplified in the optical amplifier, and the amplified signal light is transmitted through the optical bandpass filter, so that noise generated due to the amplified Spontaneous Emission (simplified "ASE" hereinafter) in the optical amplifier is removed except for the wavelength band of the signal light. The transmitted signal light is converted in the photodiode to the electric signal which is then amplified in the equalizing amplifier. The timing signal is sampled in the timing sample circuit to be supplied to the discrimination circuit in which the amplified electric signal is waveform-shaped in accordance with the timing signal to generate the information electric signal.

A second conventional optical receiver board comprises an optical fiber amplifier for amplifying an input signal light of wavelengths $\lambda_1$ and $\lambda_2$, an optical divider (splitter) for dividing (splitting) the input signal light amplified in the optical fiber amplifier into first and second signal lights, and first and second optical receiver units for generating first and second information electric signals from the first and second signal lights, wherein the first and second optical receiver units are the same in structure as the first conventional optical receiver board except that the first and second optical receiver units have no optical amplifier, because the optical fiber amplifier is provided at the front stage of the optical divider commonly to the first and second optical receiver units.

In the second conventional optical receiver board, the input signal light is amplified in the optical fiber amplifier, and the amplified signal light is divided in the optical divider to provide the first and second signal lights, respectively, to be supplied to the first an second optical receiver units. In the first optical receiver unit, the first information electric signal is obtained from the first signal light of the wavelength $\lambda_1$ in the same operation as the first conventional optical receiver board. In the same manner, the second information electric signal is obtained from the second signal light of the wavelength $\lambda_2$ in the second optical receiver unit. As the number of optical receiver unit is increased, the number of wavelengths to be multiplexed in a signal light can be increased.

In the first and second conventional optical receiver boards, the bandpass filter may be replaced by an optical wavelength-tuning filter module (often simplified "wavelength-tuning filter" hereinafter).

A conventional optical wavelength-tuning filter comprises input and output collimators and a multi-layered film interference filter provided between the input and output collimators, wherein that multi-layered film interference filter is inclined by an actuator, so that a signal light of a specified wavelength bandwidth is selected from a wavelength multiplexed signal light. Such an actuator comprises a ultrasonic motor composed of a rotor which is rotated relative to a stator in accordance with the piezo-electric effect as disclosed in the Japanese Patent Kokai No. 5-241083.

In the second optical receiver board, however, there are disadvantages in that an ideal receiving sensitivity is not obtained, the fabrication cost is high, the operation and maintenance of a wavelength-multiplexing communication system utilizing the second conventional receiver board are complicated, and the flexibility of the communication system is deteriorated. The detailed reasons will be explained prior to the disclosure of the invention.

In addition, the conventional wavelength-tuning filter has disadvantages in that the precision and dynamic characteristics of the actuator are not sufficient, because a rotating force is generated in the ultrasonic motor in accordance with frictional forces between piezo-electric ceramics and the stator, and the stator and the rotor, and that the manipulation is complicated, because its inclination angle must be adjusted to make a transmission center wavelength of a selected signal light constant, when if a collimated signal light supplied from an input collimator is changed in angle incident thereto due to the atmospheric change such as temperature, etc. At the same time, the conventional actuator for the optical wavelength-tuning filter module has disadvantages in that the size is large, a driving voltage is high, and the durability is low.

A further disadvantage is found in the conventional wavelength-tuning filter in that a polarization dependent loss ("PDL" hereinafter) inevitably fluctuates with an intensity of a received signal light. The detailed reasons will be explained prior to the disclosure of the invention.

SUMMARY OF THE INVENTION

Accordingly, it is an object of the invention to provide an optical receiver board in which a predetermined receiving sensitivity is obtained.

It is a further object of the invention to provide an optical receiver board for which the fabrication cost is low.

It is another object of the invention to provide an optical receiver board for composing a wavelength division-multiplexing communication system which is easy in operation and maintenance, and has the enhanced flexibility.

It is a still further object of the invention to provide an optical wavelength-tuning filter module for which its manipulation becomes simple.

It is a yet still further object of the invention to provide an optical wavelength-tuning filter module in which PDL is suppressed.

It is an additional object of the invention to provide an actuator for an optical wavelength-tuning filter module having the high precision and the improved dynamic characteristics.

It is a further additional object of the invention to provide an actuator for an optical wavelength-tuning filter module in which the size is small, a driving voltage is low, and the durability is high.

According to the first feature of the invention, an optical receiver board, comprises:

an input port for receiving a signal light;
an optical wavelength-tuning filter for transmitting a wavelength component of a predetermined wavelength bandwidth of the signal light;
means for controlling the optical wavelength-tuning filter to adjust a transmission center wavelength of the predetermined wavelength bandwidth; and
means for converting the signal light of the wavelength component to an information electric signal;
wherein the optical wavelength-tuning filter, comprises:
an optical filter member having a transmission profile of a single peak; and
a magnet-rotating portion for fixing the optical filter member thereon, the magnet-rotating portion being spatially rotated in accordance with an electrical control carried out by the controlling means to change the transmission center wavelength.

According to the second feature of the invention, an optical wavelength-tuning filter module, comprises:

an input collimator for collimating a wavelength multiplexed signal light to provide a collimated signal light;
a polarization-separating device for separating first and second polarizations having polarization planes which are obtained by rotating polarization planes of P and S polarizations of the collimated signal light in the same direction with a rotation angle of 40 to 50 degrees;
a transmission type interference filter having an optical filter member for receiving the signal light of first and second separated polarizations supplied from the polarization-separating device, an inclination angle of the optical filter member being variable relative to a light axis of the input collimator;
a phase plate for rotating the polarization planes of the first and second polarizations with a rotation angle of 90 degrees, the phase plate being provided on an input or output side of the transmission type interference filter;
a polarization-combining device for combining the polarization planes of the first and second polarizations transmitted through the transmission type interference filter and the phase plate; and
an output collimator for receiving the signal light supplied from the polarization-combining device.

According to the third feature of the invention, an actuator for an optical wavelength-tuning filter module, comprises:

a rotating member having one end for fixing an optical filter member which is a part of the optical wavelength-tuning filter module;
a cylindrical yoke for coaxially containing the rotating member; and
arcuate control coils for adjusting an inclination angle of the optical filter member relative to a light axis of the optical wavelengths-tuning filter module, the arcuate coils being provided on an inner wall of the cylindrical yoke, and driven by a control signal.

BRIEF DESCRIPTION OF THE DRAWINGS

The invention will be explained in more detail in conjunction with the appended drawings, wherein:

FIG. 8 is an explanatory diagram showing the optical wavelength-tuning filter in the optical receiver board in the first preferred embodiment;

DESCRIPTION OF THE PREFERRED EMBODIMENTS

Before explaining an optical receiver board and an optical wavelength-tuning filter in the preferred embodiments according to the invention, the aforementioned first and second conventional optical receiver boards and the aforementioned conventional optical wavelength-tuning filter will be explained in more detail.

Figure 1:
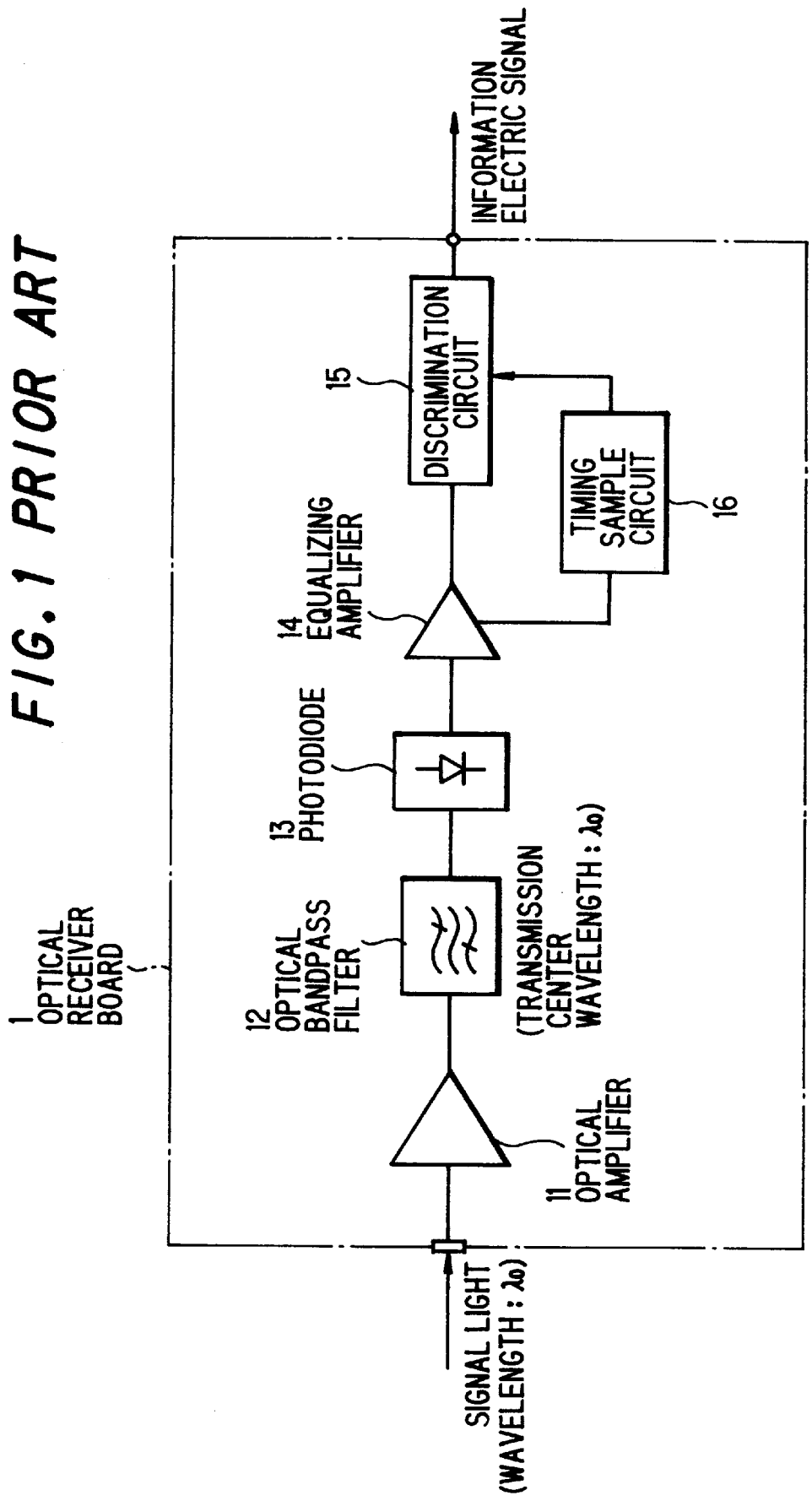
FIG. 1 is a block diagram showing the first conventional optical receiver board.

FIG. 1 shows the first conventional optical board 1 which comprises an optical amplifier 11 for amplifying an input signal light of a wavelength $\lambda_0$, an optical bandpass filter 12 having a transmission center wavelength $\lambda_0$, a photodiode 13 for converting the signal light to an electric signal, an equalizing amplifier 14 for amplifying the electric signal, a timing sample circuit 16 for sampling a timing signal from the amplified electric signal, and a discrimination circuit 15 for wave-shaping the amplified electric signal in accordance with the timing signal to generate an information electric signal.

In the first conventional optical receiver board, the input signal light is amplified in the optical amplifier 11, and the amplified signal light is transmitted through the optical bandpass filter 12, so that noise generated due to ASE in the optical amplifier 11 is removed except for a wavelength band of the signal light. The transmitted signal light is converted in the photodiode 13 to the electric signal which is then amplified in the equalizing amplifier 14. The timing signal is sampled in the timing sample circuit 16 to be supplied to the discrimination circuit 15 in which the amplified electric signal is wave-shaped in accordance with the timing signal to generate the information electric signal.

Figure 2:
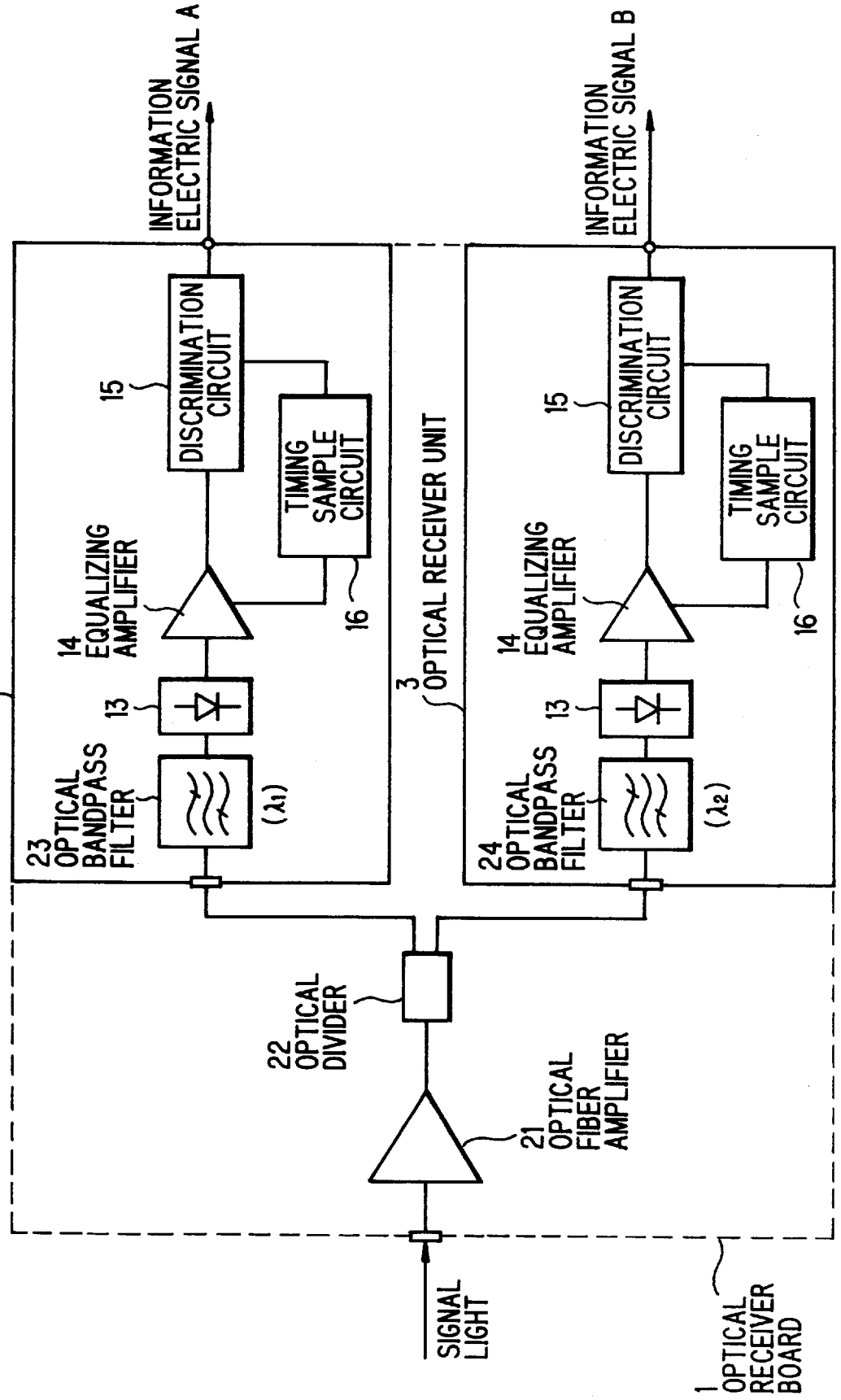
FIG. 2 is a block diagram showing the second conventional optical receiver board.

FIG. 2 shows the second conventional optical wavelength tuning filter which comprises an optical fiber amplifier 21 for amplifying an input signal light of wavelengths $\lambda_1$ and $\lambda_2$, an optical divider (splitter) 22 for dividing the input signal light as amplified in the optical fiber amplifier 21 into first and second signal lights, and first and second optical receiver units 2 and 3 for generating first and second information electric signals from the first and second signal lights, wherein the first and second optical receiver units 2 and 3 are the same in structure as the first conventional optical receiver board 1 except that the first and second optical receiver units 2 and 3 have no optical amplifier therein, because the optical fiber amplifier 21 is provided at the front stage of the optical divider 22 commonly to the first and second optical receiver units 2 and 3.

In the second conventional optical receiver board, the input signal light is amplified in the optical fiber amplifier 21, and the amplified signal light is divided in the optical divider 22 to provide the first and second signal lights, respectively, to be supplied to the first and second optical receiver units 2 and 3. In the first optical receiver unit 2, the first information electric signal is obtained from the signal light of the wavelength $\lambda_1$, in the same operation as the first conventional optical receiver board 1. In the same manner, the second information electric signal is obtained from the signal light of the wavelength $\lambda_2$, in the second optical receiver unit 3. As the number of optical receiver units is increased, the number of wavelengths to be multiplexed in a signal light can be increased.

In the first and second conventional optical receiver boards, the bandpass filter may be replaced by an optical wavelength-tuning filter.

Figure 3:
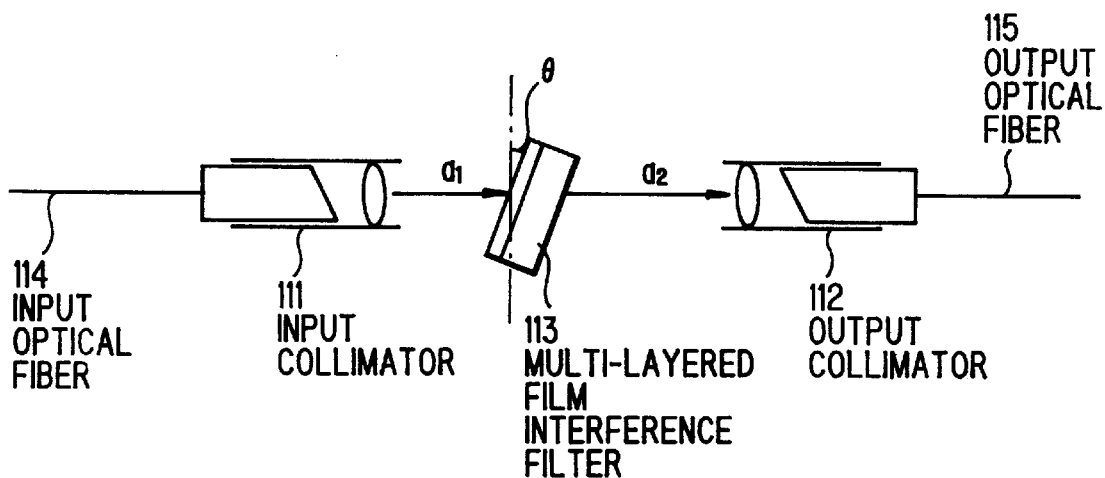
FIG. 3 is an explanatory diagram showing the conventional optical wavelength-tuning filter module.

FIG. 3 shows the conventional optical wavelength-tuning filter which comprises an input collimator 111, an output collimator 112, and a multi-layered film interference filter 113 positioned between the input and output collimators 111 and 112.

In the optical wavelength-tuning filter, the input collimator 111 is coupled to an input optical fiber 111 to be supplied with a wavelength multiplexed signal light which is therein to be a collimated signal light $a_1$. The multi-layered film interference filter 113 is a transmission type interference filter which is composed of approximately 40 to 50 high and low refractive index dielectric thin films which are alternately laminated, and is rotated to be inclined to the collimated signal light $a_1$ with an incident angle θ, so that a transmission center wavelength of a signal light $a_2$ to be received by the output collimator 112 can be varied with the adjustment of the incident angle θ. The output collimator 112 is supplied with a signal light $a_2$ having a transmission center wavelength which is tuned in the multi-layered film interference filter 13 to be selected from the input wavelength multiplexed signal light, and the selected signal light $a_2$ is supplied via an output optical fiber 115 to a photodetector (not shown). The input and output optical fibers 114 and 115 are usually single mode optical fibers.

Here, the second conventional optical receiver board as shown in FIG. 2 will be discussed in more detail. In the second conventional optical receiver board, when an amplified gain of the optical fiber amplifier 21 is high, and separation (splitting) degrees of the wavelengths $\lambda_1$ and $\lambda_2$ of the transmitted signal lights from the other wavelengths of the input wavelength multiplexed signal light and the removal of ASE noise are sufficient, it is expected that the high receiving sensitivity is obtained as in the first conventional optical receiver board receiving a signal light of a single wavelength shown in FIG. 1.

In general, when a bandpass width of an optical bandpass filter such as those 12, 23 and 24 in FIGS. 1 and 2 is narrow, ASE noise received by a photodiode such as those 13 in FIGS. 1 and 2 is decreased to increase the receiving sensitivity. In such a case, however, when a wavelength of an input signal light is deviated from a predetermined wavelength, a power of the signal light transmitted through the optical bandpass filter is sharply decreased to deteriorate the receiving sensitivity. As a result, the high receiving sensitivity is not stably maintained in such an optical receiver board. For this reason, a bandpass width of an optical bandpass filter is usually set to be more than several nm by considering the stability of a lasing wavelength of a semiconductor laser in a light source. Consequently, an ideal receiving sensitivity is not obtained in such an optical receiver board. In addition, the semiconductor laser and the optical bandpass filter must be selected in properties to coincide its lasing wavelength and its transmission center wavelength.

Further, cost of fabricating the second conventional optical receiver board is increased, because a plurality of optical bandpass filters having different transmission center wavelengths are used for a plurality of optical receiver units, and the operation and maintenance of a wavelength division multiplexed communication system becomes complicated, because many numbers of optical receiver units must be prepared to maintain the system in which an optical bandpass filter of a specified bandpass wavelength is not used commonly for optical receiver units having different receiving wavelengths.

Still further, when an information electric signal is switched to be received in one of the optical receiver units by another information electric signal, the optical receiver unit must be wholly replaced by another receiver unit. This results in lowering the flexibility in a wavelength division multiplexed communication system.

In order to overcome these disadvantages in the second conventional optical receiver board, it is considered that an optical wavelength-tuning filter such as a multi-layered film interference filter is used therein as explained in FIG. 3. In addition to the multi-layered film interference filter, an optical wavelength-tuning filter using a Fabry Perrot Ethalone device, an acoustic-optical device, etc. may be used therein.

In the optical wavelength-tuning filter using the Fabry Perrot Ethalone device, however, the transmission characteristics such as a bandpass width, a light extinction ratio, an insertion loss of the device and the like are determined dependently on a length and a parallel degree of a cavity composing an ethalone to make it difficult that those are stably maintained to provide the reliability which is important for an optical fiber communication system to be applied to the public-use communication.

In the optical wavelength-tuning filter using the acoustic-optical device, a separation degree of a tuned wavelength from wavelengths of a wavelength multiplexed signal light is low, because a light extinction ratio of the acoustic-optical device is not sufficient. In addition, there is a disadvantage in that an applied frequency must be changed by approximately 100 MHz to change a tuned frequency.

Here, the optical wavelength-tuning filter using the multi-layered film interference filter 113 as shown in FIG. 3 will be discussed in more detail.

A signal light transmitted through the input optical fiber 114 is usually polarized. Therefore, when it is transmitted through the optical wavelength-tuning filter, loss occurs therein. As a result, when the center wavelength of the signal light $a_2$ supplied from the multi-layered film interference filter 113 to the output collimator 112 is changed, an intensity of a signal light supplied from the output optical fiber 115 is deviated. In more detail, two polarization states are existed in a single mode optical fiber through which a signal light is transmitted, wherein the two polarization states are of two linear polarizations (P and S polarizations), polarization planes of which are orthogonal to each other.

Figure 4:
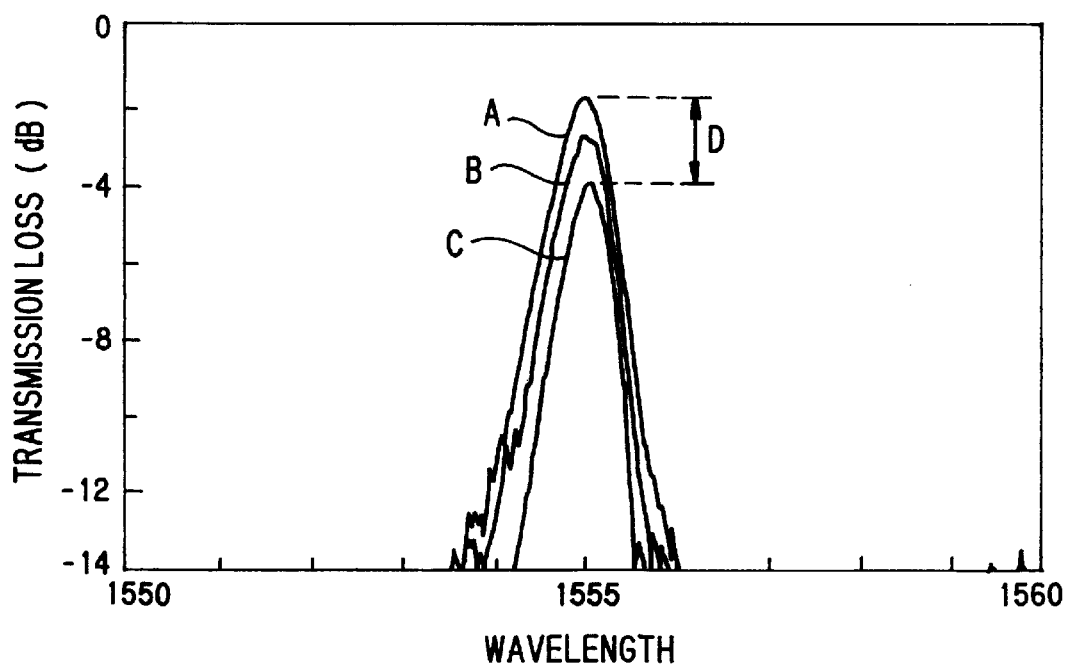
FIG. 4 is a graph showing the transmission loss relative to the wavelength of a signal light in the conventional wavelength-tuning filter module in FIG. 3.

FIG. 4 shows the light transmission characteristics in the conventional optical wavelength-tuning filter as shown in FIG. 3, in which the curve A indicates a transmission loss where a signal light of P polarization is supplied thereto, the curve B indicate a transmission loss where a signal light of S and P polarizations is supplied thereto, and the curve C indicates a transmission loss where a signal light of S polarization is supplied thereto, while the multi-layered interference filter 113 is adjusted to transmit a signal light having a center wavelength of 1555 nm.

As apparent in FIG. 4, the transmission losses are different dependently on polarization among the signal lights. This causes PDL to occur, when a light intensity ratio is changed between S and P polarizations of a signal light, and PDL is indicated to be approximately 2 dB by D representing a difference of the transmission losses of S and P polarizations.

Practically, different polarization states are found in a wavelength multiplexed signal light transmitted through the input optical fiber 114, and a light intensity ratio of S and P polarizations is different at a wavelength band from that at another wavelength band. As a result, when an incident angle θ of the multi-layered film interference filter 113 is changed to change the center wavelength of the signal light $a_2$, PDL is largely changed to result in the change in an intensity of a signal light supplied from the output optical fiber 115.

For instance, when it is assumed that a half value width of the multi-layered film interference filter 113 is less than 1 μm, where a center wavelength of the signal light $a_2$ received by the output collimator 112 is changed in accordance with the change of the incident angle θ by more than 10 nm, PDL is changed by more than 1 dB. In a wavelength division multiplexed optical communication system, PDL becomes large, as the half value width becomes small, and an intensity of a signal light transmitted through an optical wavelength-tuning filter is largely fluctuated dependently on wavelength band, as PDL is large. This must be avoided in a communication system.

Next, an optical receiver board in the first preferred embodiment according to the invention will be explained.

Figure 5:
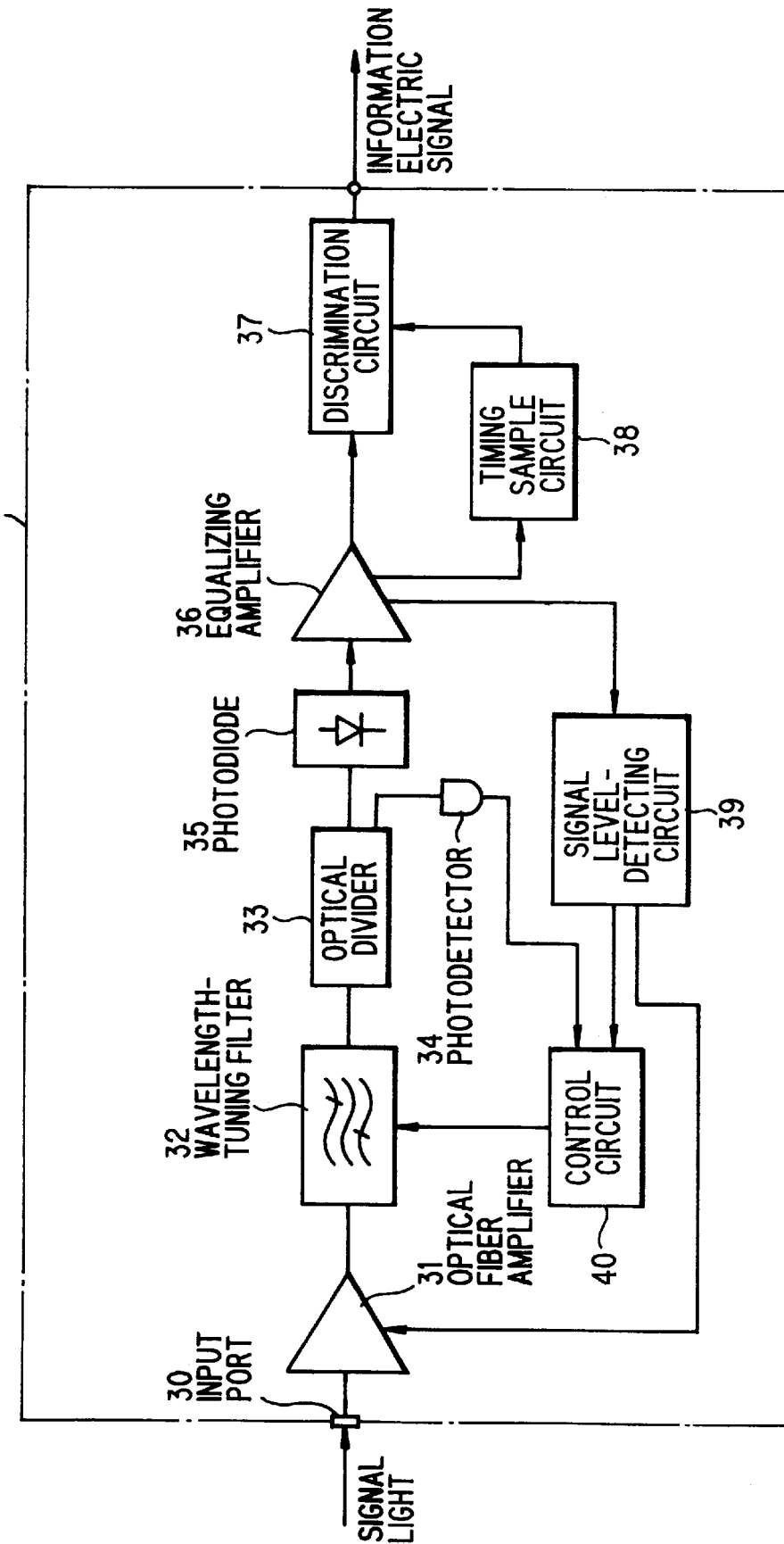
FIG. 5 is a block diagram showing an optical receiver board in the first preferred embodiment according to the invention.

FIG. 5 shows the optical receiver board 1 in the first preferred embodiment which comprises an optical fiber amplifier 31 for amplifying a signal light supplied to an input port 30 with a variable gain which is controlled by a level detected signal (to be explained later), an optical wavelength-tuning filter 32 for transmitting a signal light of a frequency component at a predetermined bandpass width (to be explained in FIG. 8), an optical divider 33 for dividing a transmitted signal light into first and second signal lights, a photodiode 35 for converting the first signal light to a first electric signal, a photodetector 34 for converting the second signal light to a second electric signal, an equalizing amplifier 36 for amplifying the first electric signal, a timing sample circuit 38 for sampling a timing signal from an electric signal amplified in the equalizing amplifier 36, a discrimination circuit 37 for wave-shaping the amplified electric signal in accordance with the timing signal to generate an information electric signal, a signal level-detecting circuit 39 for detecting the presence and non-presence of an optical-to-electrical converted signal in the equalizing amplifier 36 to generate the level detected signal, and a control circuit 40 for controlling the optical wavelength-tuning filter 32 in accordance with an optical-to-electrical converted signal from the photodetector 34 and the level detected signal from the signal level-detecting circuit 39.

Figure 6:
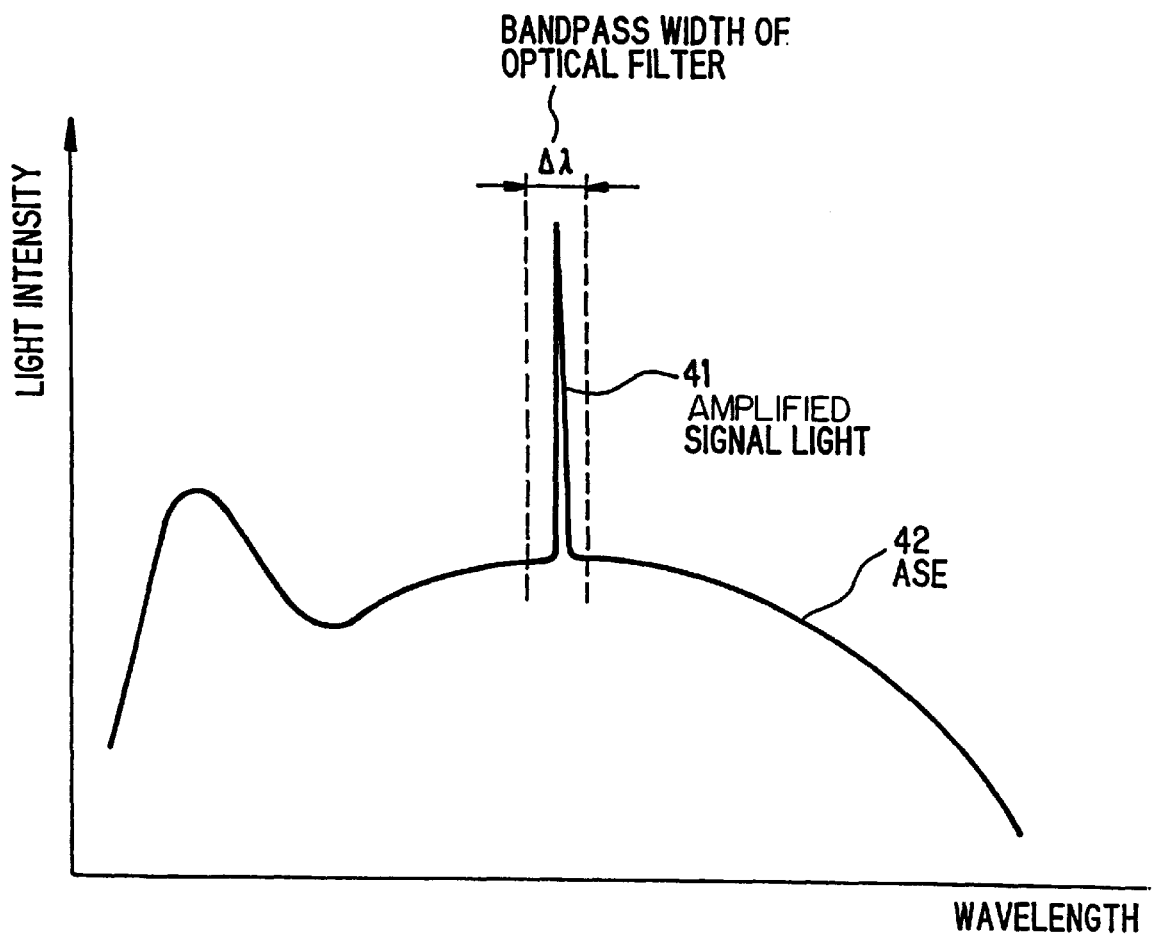
FIG. 6 is a graph showing a spectrum of an output light in an optical fiber amplifier in the optical receiver board in the first preferred embodiment.

FIG. 6 shows an output light intensity relative to a wavelength in the optical fiber amplifier 31 as explained in FIG. 5, wherein the reference numeral 41 indicates an amplified signal light obtained by amplifying the input signal light supplied thereto, and the reference numeral 42 indicates ASE which is noise relative to the signal light. This ASE noise becomes a high frequency white noise after the optical-to-electrical conversion in the photodiode 35 in accordance with the interference with the signal light and itself. In the preferred embodiment, however, this ASE noise is removed in the wavelength-tuning filter 32 having a bandpass width Δλ prior to the optical-to-electrical conversion in the photodiode 35 by supplying the signal light to the wavelength-tuning filter 32, in which bandpass width Δλ is preferably set to be narrow sufficiently relative to the ASE spectrum and to be wide sufficiently relative to the signal light spectrum.

Figure 7:
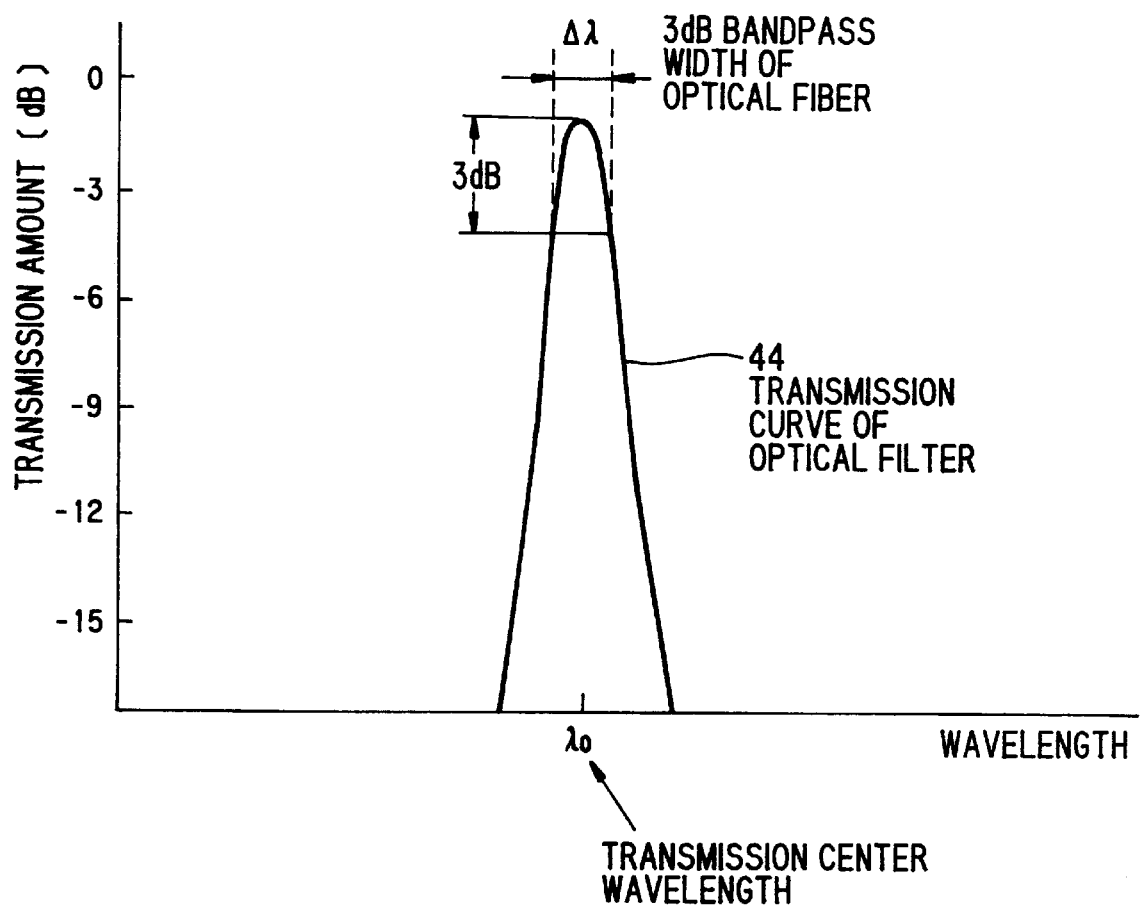
FIG. 7 is a graph showing the transmission characteristics in an optical wavelength-tuning filter in the optical receiver board in the first preferred embodiment.

FIG. 7 shows a preferable example of the transmission characteristics in the optical wavelength-tuning filter 32, in which a transmission curve is expressed to have a single peak and transmit only a light of an extremely narrow wavelength range in the vicinity of the transmission center wavelength $\lambda_0$. Therefore, when a wavelength of an input signal light is coincided with the transmission center wavelength $\lambda_0$, almost all of the ASE noise is removed from an output light of the optical wavelength-tuning filter 32. Consequently, noise is decreased in converting the output light to an electric signal in the photodiode 35, so that a higher receiving sensitivity is obtained in the optical receiver board 1.

On the other hand, when the bandpass width of the optical wavelength-tuning filter 32 is narrower than that shown in FIG. 7, a spectrum component of the signal light is also removed to lower the receiving sensitivity due to the resultant intercode interference. Theoretically, the minimum bandpass width of the optical wavelength-tuning filter 32 is approximately twice a bit rate (modulation velocity) of a signal light. For instance, when a signal light is modulated by 2.5 Gb/s, it is preferably set to be 5 GHz (approximately 0.04 nm).

FIG. 8 shows the optical wavelength-tuning filter 32 which comprises an input optical fiber terminal 51, an output optical fiber terminal 52, light-coupling lens systems 531 and 532, polarization-separating and combining devices 541 and 542 each comprising a polarization-splitter and a wavelength plate, a rotation actuator 55 comprising a magnet-rotating portion and coils, an optical filter film member 56, and electrodes 561 to 563.

In the optical wavelength-tuning filter 32, an input light supplied to the input optical fiber terminal 51 is collimated by the light-coupling lens system 531, and the collimated input light is converted to be of a single polarization by the polarization-separating and combining device 541. The collimated input light is supplied to the optical filter film member 56, so that a light outside a bandpass width which is determined by an incident angle of the collimated input light to the optical filter film member 56 is removed therein. Polarizations of a wavelength components of a light transmitted through the optical filter film member 56 are spatially combined in the polarization-separating and combining device 542 to be coupled to the output optical fiber terminal 52 by the light-coupling lens system 532. In accordance with the polarization conversion in the polarization-separating and combining device 541, the change of a transmission factor and a bandpass width which are caused dependently by a polarization state of an input light are avoided.

Figure 9A:
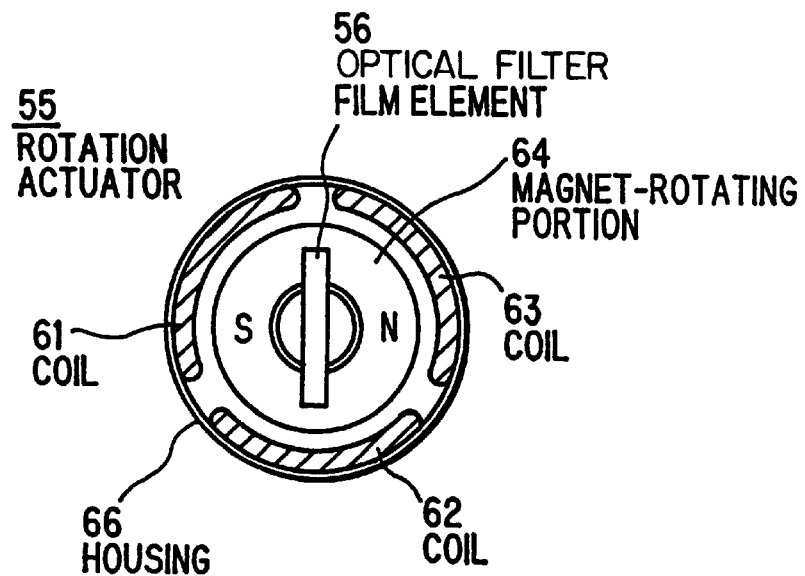
FIGS. 9A and 9B are cross-sectional views taken along horizontal and vertical lines showing an actuator in the optical wavelength-tuning filter in the optical receiver board in the first preferred embodiment.
Figure 9B:
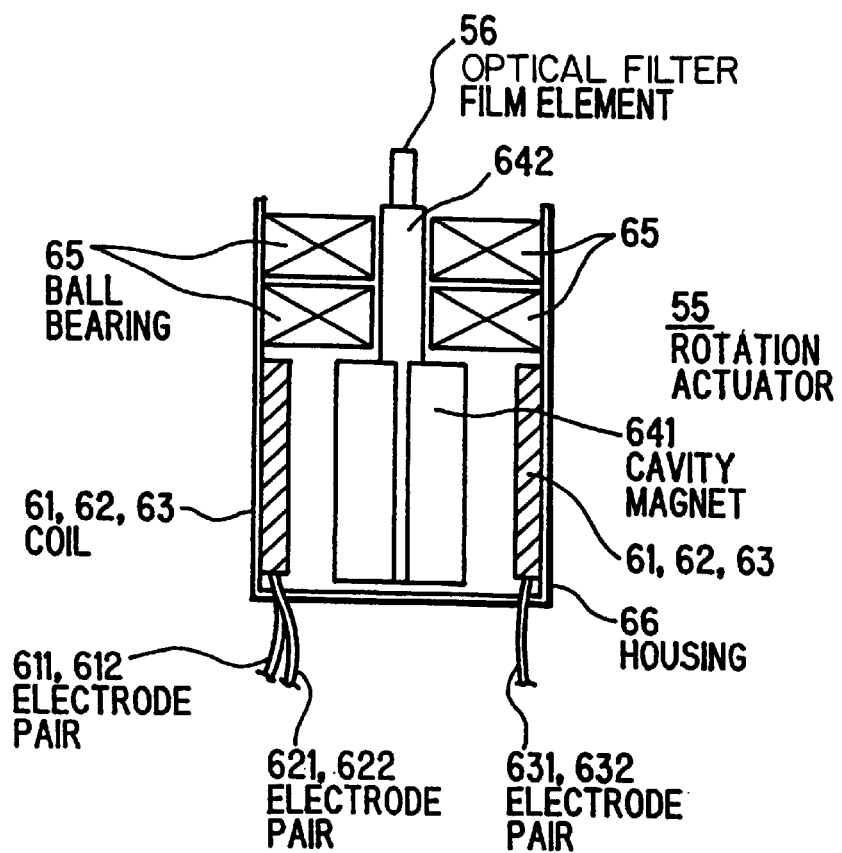

FIGS. 9A and 9B show the rotation actuator 55 in the optical wavelength-tuning filter 32, wherein the reference numerals 61 to 63 indicate coils, the reference numerals 611, 612, 621, 622, 631, 632 indicate electrode pairs, the reference numeral 64 indicates a magnet-rotating portion, the reference numeral 641 indicates a cavity magnet, the reference numeral 642 indicates a support, the reference numeral 65 indicates ball bearings, and the reference numeral 66 indicates a housing.

In the rotation actuator 55, the three coils 61 to 63 are fixed with equal interval to the inside wall of the housing 66, currents flow between the electrode pair 611 and 612, the electrode pair 621 and 622, and the electrode pair 631 and 632, respectively, corresponding to the coils 61 to 63. The magnet-rotating portion 64 is composed of the cavity magnet 641 and the support 642, such that the optical filter film member 56 is fixed on the top of the support 642 which is supported to be freely rotated by the ball bearings 65 provided on the inside wall of the housing 66. The cavity magnet 641 is magnetized in the direction orthogonal to the rotation axis thereof to represent S and N polarities as shown in FIG. 9A.

Figure 10:
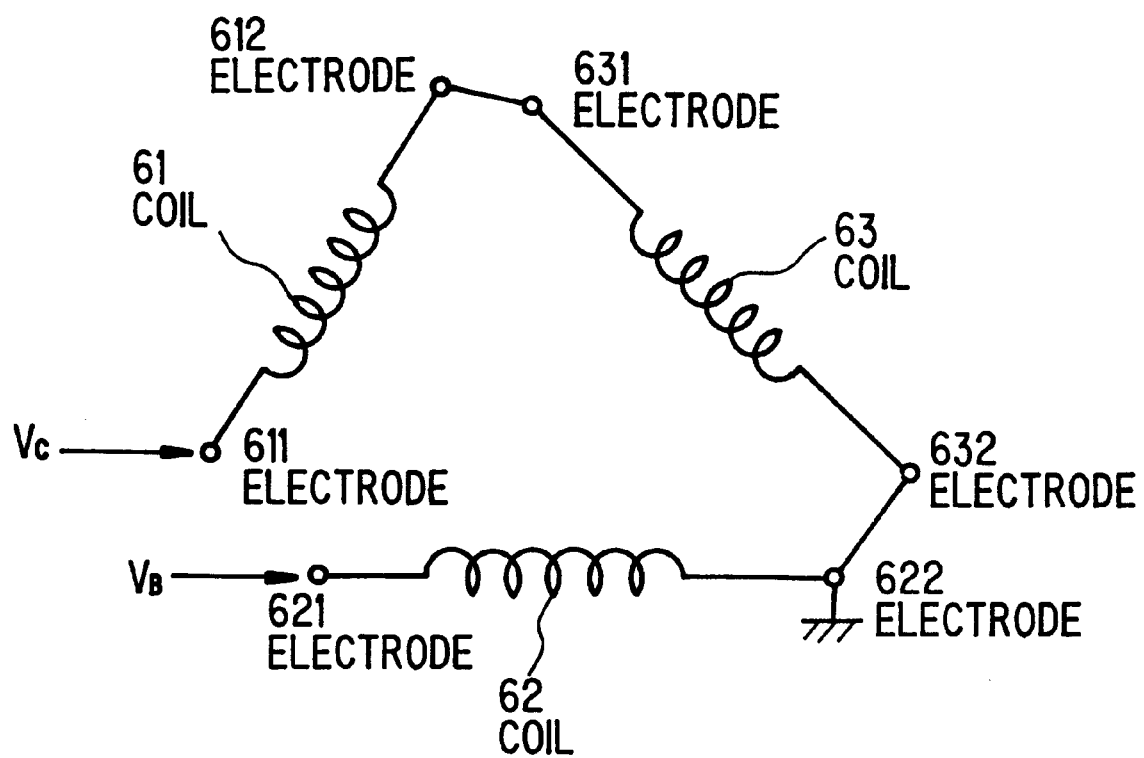
FIG. 10 is an explanatory diagram showing coils in the optical wavelength-tuning filter in the optical receiver board in the first preferred embodiment.

FIG. 10 shows that the coils 61 and 63 are connected in series to be applied with a voltage $V_C$, and the coil 62 is applied with a voltage $V_B$, so that the coils 61 and 63 generate magnetic fields which are opposite to each other in relation to the cavity magnet 641. Among the electrode pairs 611 and 612, 621 and 622, and 631 and 632 as shown in FIG. 9B, the electrodes 611, 621 and 622 correspond to the electrodes 561 to 563 as shown in FIG. 8.

Figure 11A:
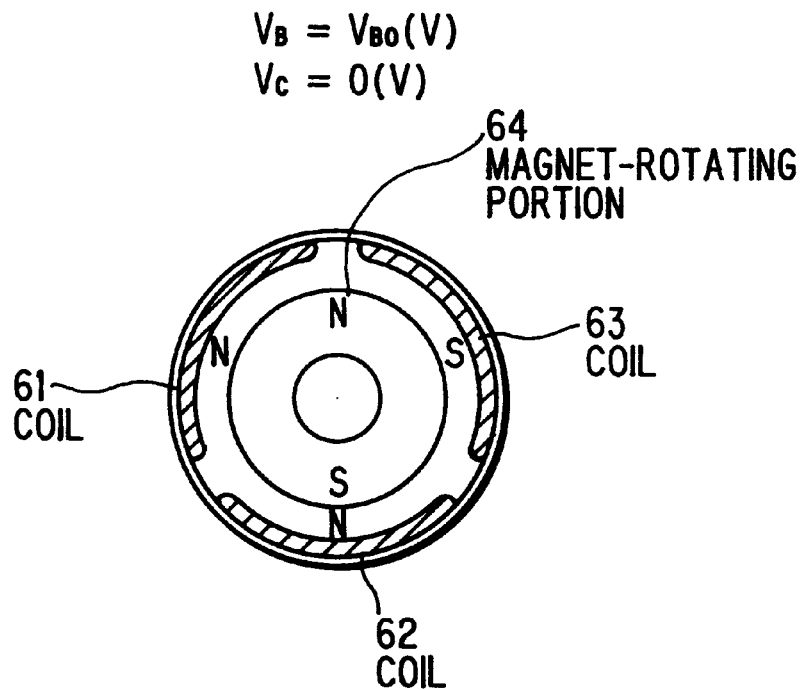
FIGS. 11A and 11B are cross-sectional views taken along a horizontal line showing operation of the actuator in the optical wavelength-tuning filter in the optical receiver board in the first preferred embodiment.
Figure 11B:
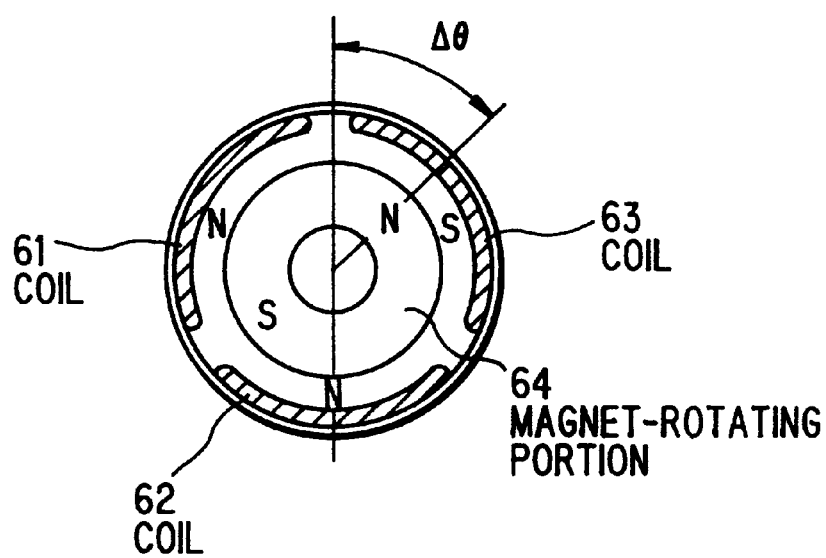

In operation of the rotation actuator 55, the voltage $V_B$ ($V_B=V_{B0}$) is first applied to the electrode 621 to flow a current through the coil 62, so that the coil 62 represents N polarity to generate an attractive force relative to S polarity of the magnet-rotating portion 64, thereby resulting in the state as shown in FIG. 11A. At this state, the voltage $V_C$ ($V_C=V_{C0}$) is applied to the electrode 611 to flow a current through the coils 61 and 63, so that the coil 61 represents N polarity to generate a repulsive force relative to the magnet-rotating portion 64, and the coil 63 represents S polarity to generate an attractive force thereto. When these forces overcome the attractive force between the coil 62 and the magnet-rotating portion 64, the magnet-rotating portion 64 rotates in the clockwise direction, and stops rotating at a position where this rotating force is balanced with the magnetic forces of the three coils 61 to 63 as shown in FIG. 11B by an angle Δθ. As understood from this operation, when the voltage $V_C$ applied to the electrode 611 is controlled to be adjusted in its value, a rotating angle of the magnet-rotating portion 64 is controlled to be a predetermined value.

Referring back to FIG. 5, the output light of the optical wavelength-tuning filter 32 is portionally divided to be supplied to the photodetector 34, from which a converted electric signal is supplied to the control circuit 40, in which a control signal supplied to the optical wavelength-tuning filter 32 is adjusted to maximize a power detected in the photodetector 34. Consequently, a wavelength of the input signal light is caused to coincide with the transmission center wavelength of the optical wavelength-tuning filter 32 to constantly maximize the output signal light in accordance with the tracking control carried out by the control circuit 40.

Figure 12:
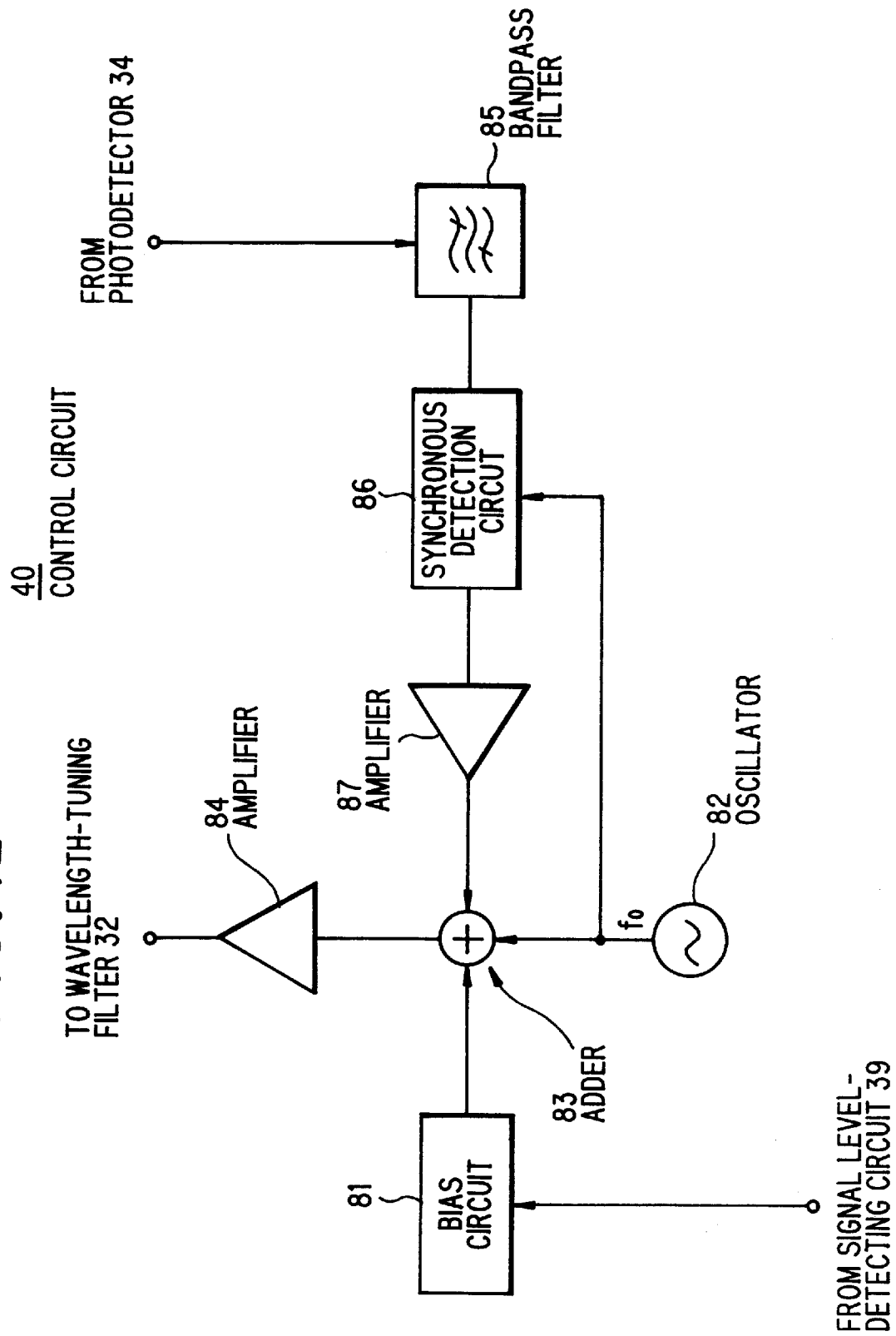
FIG. 12 is a block diagram showing a control circuit in the optical receiver board in the first preferred embodiment.

FIG. 12 shows the control circuit 40 which comprises a bias circuit 81 for generating a sweep voltage which is a DC component of the tracking control signal to change the transmission center wavelength of the optical wavelength-tuning filter 32, an oscillator 82 for generating an AC component of the tracking control signal to detect a tracking error signal in the tracking control and carry out a fine modulation of a frequency fm to lock the transmission center frequency of the optical wavelength-tuning filter 32 with the wavelength of the signal light, an adder 83 for adding an output of the bias circuit 81, an output of the oscillator 82, and an amplified signal to be explained later to supply an added signal to an amplifier 84 connected to the optical wavelength-tuning filter 32, a bandpass filter 85 for sampling a component of the frequency fm from an output of the photodetector 34, a synchronous detection circuit 86 for detecting an output of the bandpass filter 85 synchronized with the frequency fm of the oscillator 82, and an amplifier for amplifying an output of the synchronous detection circuit 86 to provide aforementioned amplified signal with the adder 83.

In starting the operation of the optical receiver board 1, an output of the bias circuit 81 is swept to change the transmission center wavelength of the optical wavelength-tuning filter 32. When a wavelength of the signal light becomes inside the bandpass width of the optical wavelength-tuning filter 32, an output light power is increased, so that a predetermined electric signal is detected in the signal level-detecting circuit 39. When the electric signal is greater than a predetermined threshold value, the bias circuit 81 is stopped in sweep operation to hold an output sweep voltage at the moment. In this preferred embodiment, the sweep voltage is a saw-tooth voltage which is monotonously increased in regard to time, and the sweep operation is carried out in one direction to suppress the influence of hysteresis characteristics in relation of the transmission center wavelength to the sweep voltage caused by residual magnetic field, etc.

On the other hand, the component of the frequency fm is sampled in the bandpass filter 85 from an output of the photodetector 34 to be supplied to the synchronous detection circuit 86, in which the sampled component of the frequency fm is compared in phase with the output of the oscillator 82, so that an output voltage is generated therein in accordance with the phase comparing result. The synchronous detection output thus generated is amplified in the amplifier 87 to be added to the output sweep voltage of the bias circuit 81 and the output of the oscillator 82 in the adder 83. The added output is amplified in the amplifier 84 to be supplied to the optical wavelength-tuning filter 32.

Figure 13:
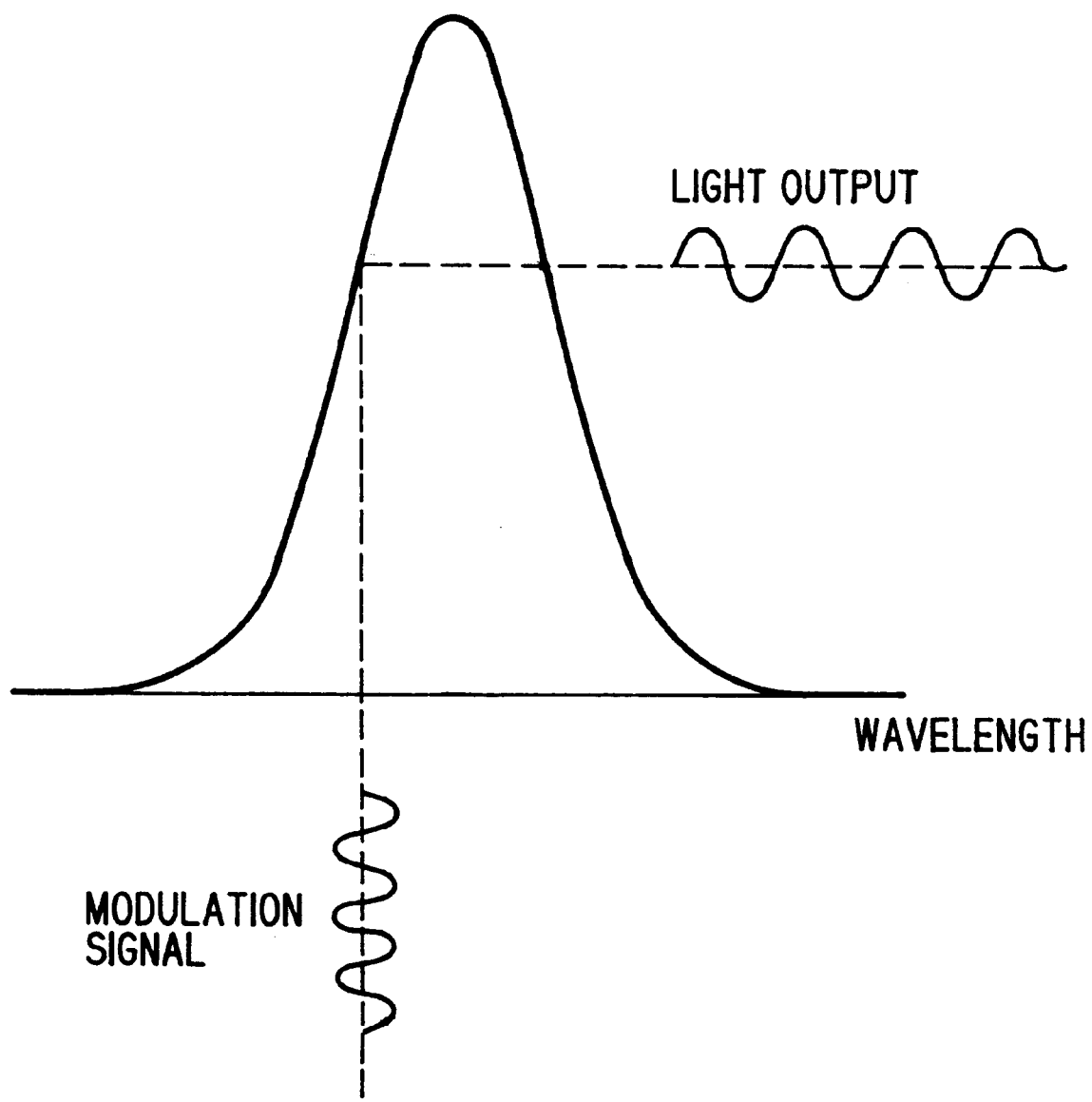
FIGS. 13 to 15 are graphs showing the control principle in the optical wavelength-tuning filter in the optical receiver board in the first preferred embodiment.

FIG. 13 shows the transmission profile of the optical wavelength-tuning filter 32 having a single peak and the presence of a modulation signal light on the left side of the transmission profile center in regard to wavelength. In this case, the light output of the optical wavelength-tuning filter 32 includes a component of the same frequency fm as the frequency of an output from the oscillator 82.

Figure 14:
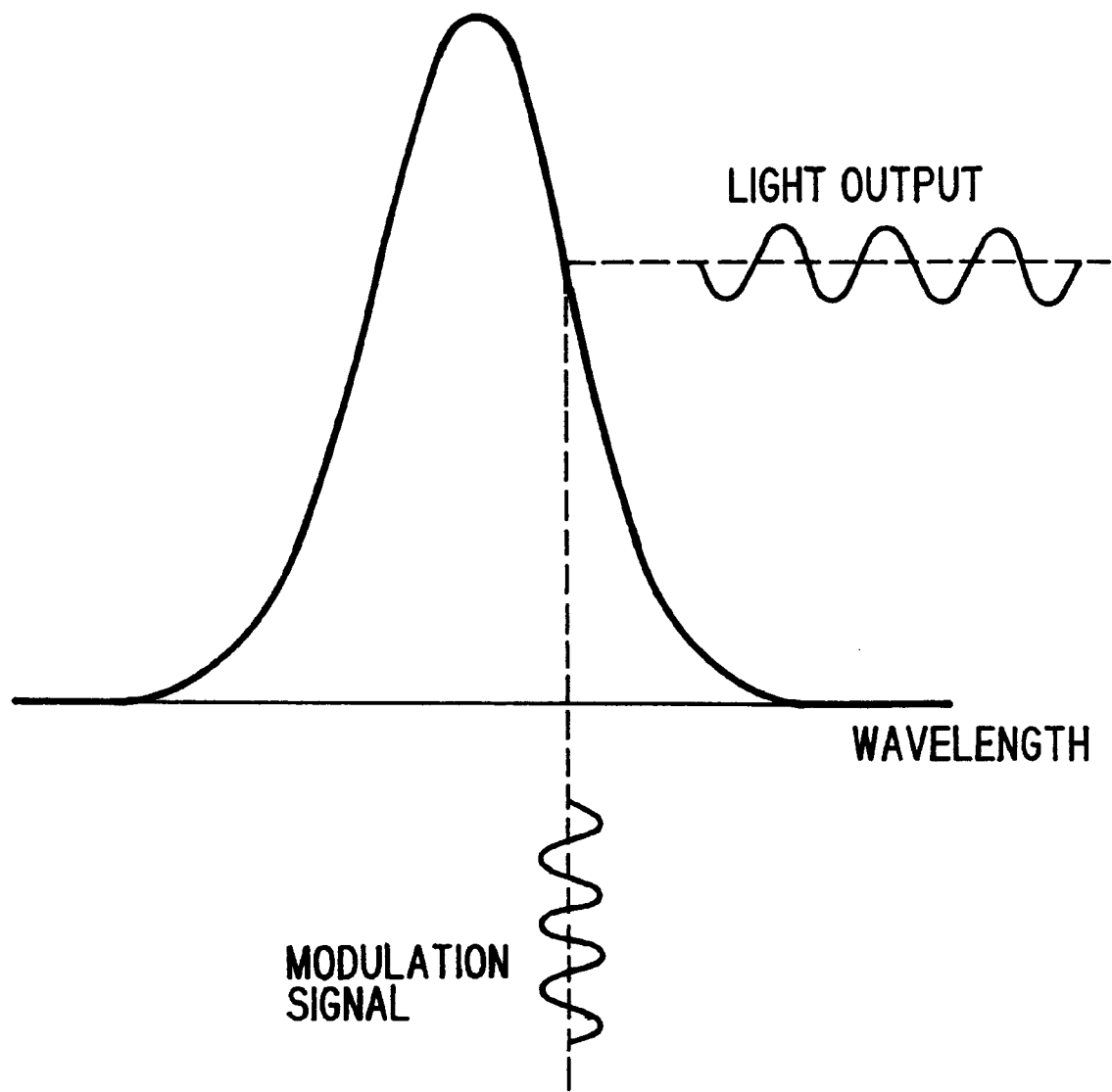

FIG. 14 shows the transmission profile of the optical wavelength-tuning filter 32 having a single peak and the presence of a modulation signal light on the right side of the transmission profile center in regard to wavelength. In this case, the light output of the optical wavelength-tuning filter 32 includes a component of the same frequency fm as the frequency of an output form the oscillator 82 in the same manner as in FIG. 13.

Figure 15:
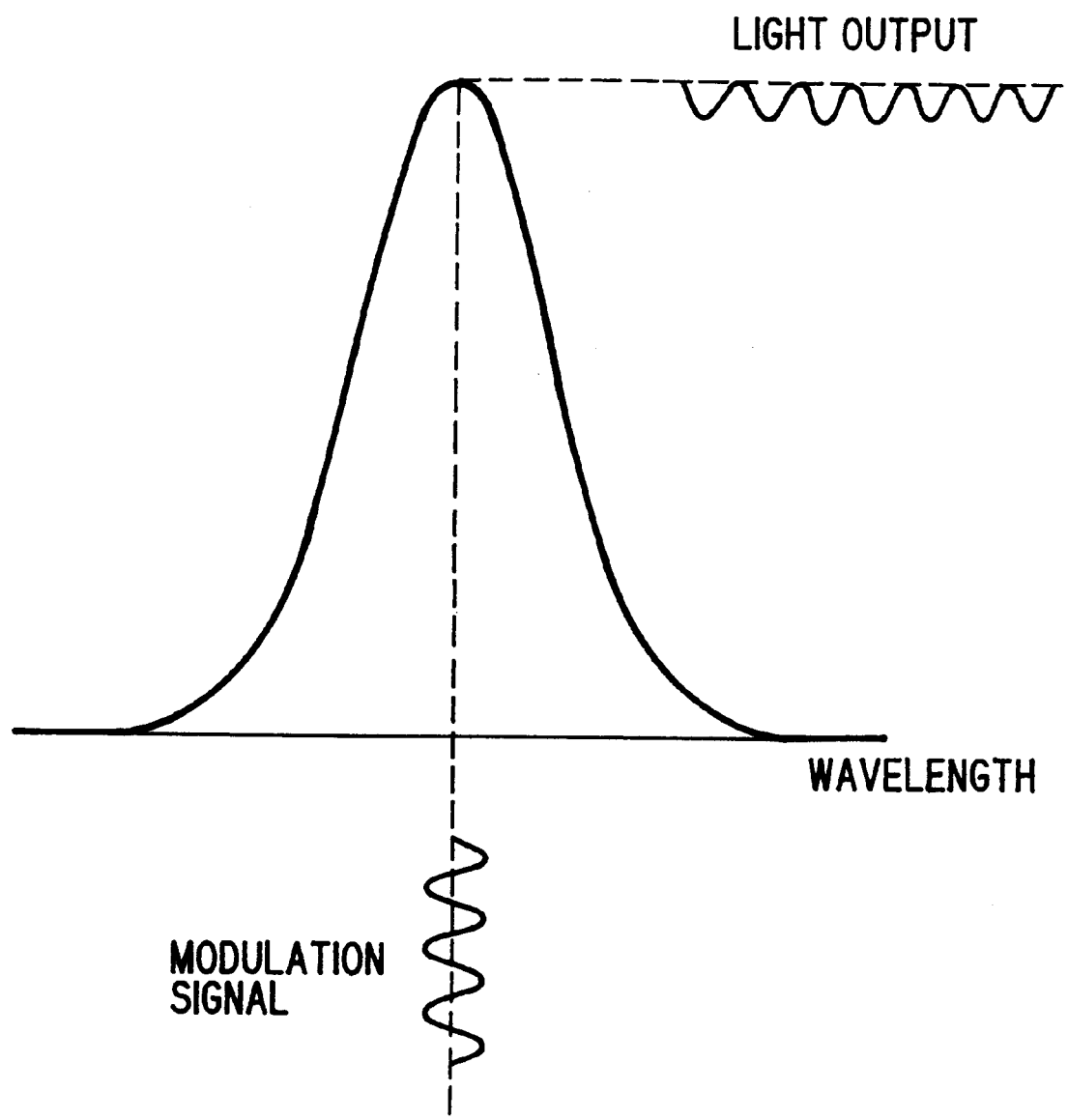

FIG. 15 shows the transmission profile of the optical wavelength-tuning filter 32, having a single peak and the presence of a modulation signal light in the center of the transmission profile in regard to wavelength. In this case, the light output of the optical wavelength-tuning filter 32 includes a component of a frequency which is twice the frequency of the modulation signal light, while a component of the frequency fm is at the lowest level.

In accordance with the feature of the component of the frequency fm, the optical wavelength-tuning filter 32 is feedback-controlled through the adder 83 and the synchronous detection circuit 86 to minimize the component of the frequency fm, so that the tracking control in which the transmission center wavelength of the optical wavelength-tuning filter 32 is made to constantly coincide with a wavelength of the signal light is carried out.

Referring again back to FIG. 5, the amplified signal light with ASE noise removed in accordance with the transmission of the optical wavelength-tuning filter 32 is portionally divided in the optical divider 33 to be supplied to the photodiode 35, in which the divided signal light is converted to an electric signal which is then amplified in the equalizing amplifier 36. Then, the amplified electric signal is waveform-shaped in the discrimination circuit 37 to generate an information electric signal by using the timing signal supplied from the timing sample circuit 38.

Figure 16:
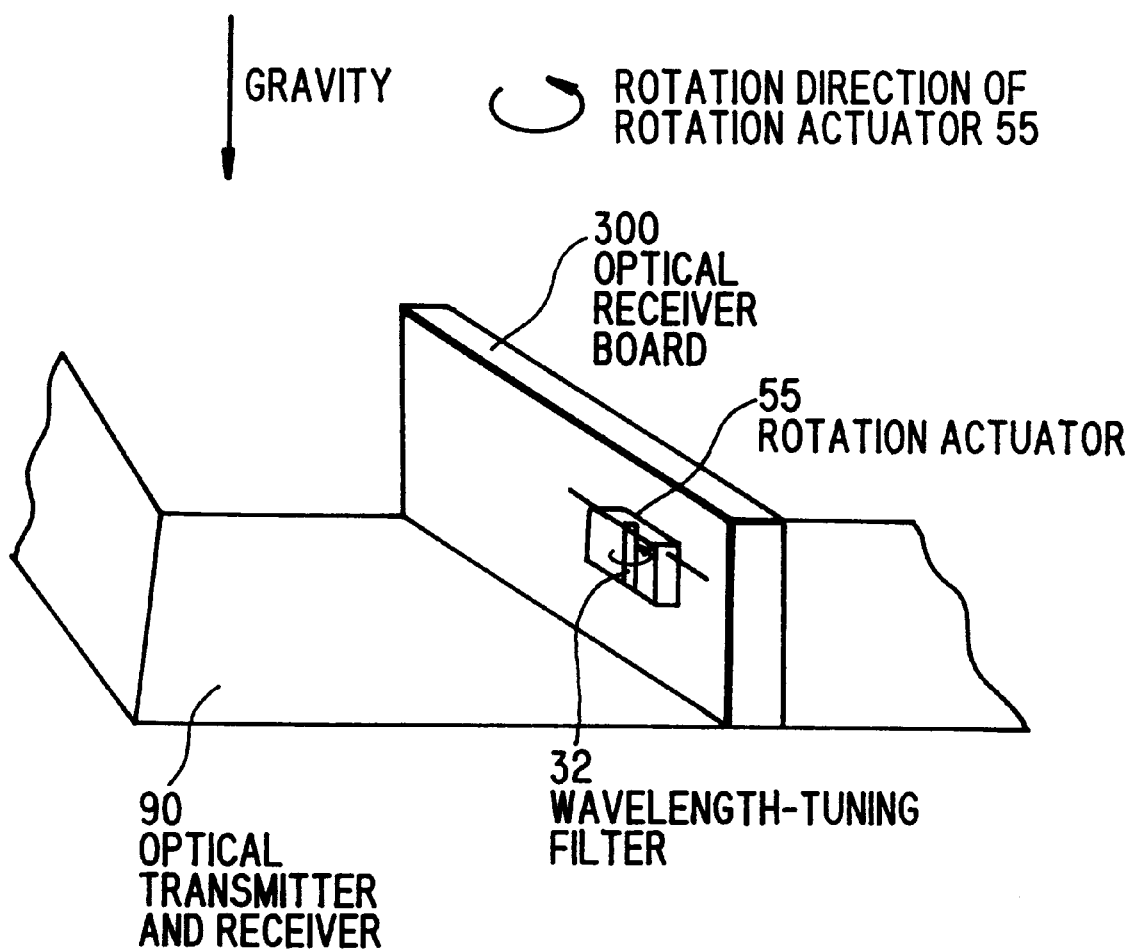
FIG. 16 is an explanatory diagram showing the optical receiver board in the first preferred embodiment.

FIG. 16 shows the manner in which the optical wavelength-tuning filter 32 is provided in the optical receiver board 300 mounted in an optical transmitter and receiver 90, in which the rotation actuator 55 is provided in the optical wavelength-tuning filter 32, such that the rotating axis of the rotation actuator 55 is parallel to the direction of the gravity. Consequently, the influence of the gravity on the rotating operation of the rotating actuator 55 is equalized and minimized around the rotating axis thereof, so that the secular variation of the rotation precision caused by loads of each component are suppressed. On the other hand, if the rotation axis of the rotation actuator 55 is orthogonal to the direction of the gravity, frictional coefficients of the support 642 relative to the ball bearings 65 may be changed due to the secular variation.

Figure 17:
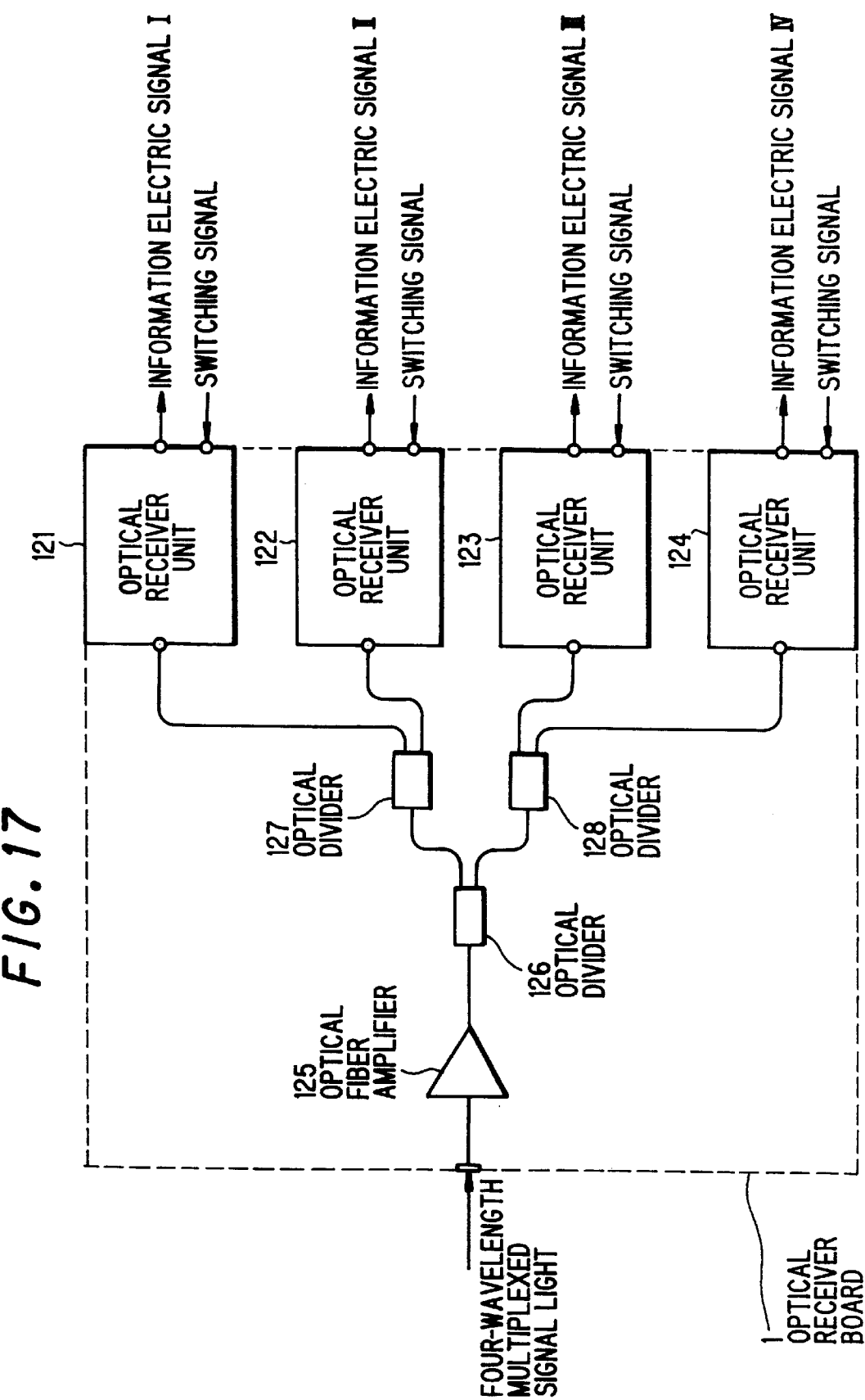
FIG. 17 is a block diagram showing an optical receiver board in the second preferred embodiment according to the invention.

FIG. 17 shows an optical receiver board 1 in the second preferred embodiment according to the invention. The optical receiver board 1 comprises an optical fiber amplifier 125 using an Er-doped optical fiber for amplifying a four-wavelength multiplexed signal light, optical dividers 126 to 128, and optical receiver units 121 to 124 which are of the same kind as the optical receiver board 1 as shown in FIG. 4. In the optical receiver board 1, each of the optical dividers 126 to 128 is a 3 dB fused type optical fiber coupler.

In the optical receiver board 1, the four-wavelength multiplexed signal light is amplified in the optical fiber amplifier 125, and the amplified four-wavelength multiplexed signal light is equally divided in the optical dividers 126 to 128 into first to fourth four-wavelength multiplexed signal lights, respectively, to be supplied to the optical receiver units 121 to 124. In each of optical receiver units 121 to 124, a bias voltage applied to an optical wavelength-tuning filter (designated in FIG. 5 by the reference numeral 32) is swept, and the sweep operation stops to start the control of the transmission center frequency, when a predetermined information electric signal is obtained. On the other hand, when the predetermined information electric signal is not obtained in an optical receiver unit, a switching signal is applied to the optical receiver unit to start the sweep operation in accordance with a bias voltage of a different sweep range.

In the second preferred embodiment, a signal light of each wavelength is coded with a discrimination code corresponding to the signal light. Thus, the switching operation in the optical receiver units 121 to 124 is carried out in accordance with the coincidence and non-coincidence of the discrimination code. All of the optical receiver units 121 to 124 are of the same interchange structure. Therefore, only one kind of optical receiver units is necessary to be prepared for system maintenance.

In the first preferred embodiment as explained before, the detail of the optical receiver board 1 will be explained as follows:

(1) signal light
   wavelength: 1558 nm
   bit rate: 10 Gb/s
(2) optical fiber amplifier 31 of Er-doped optical fiber
   noise index: 5 dB maximum gain: 40 dB
(3) optical wavelength-tuning filter 32 of multi-layered dielectric film filter
half value width: 0.2 nm
magnet-rotating portion 64: Permalloy
wavelength-tuning width: 1530 to 1570 nm
filter loss: 1.9 dB
PDL: less than 0.1 dB
size: 8 mm×40 mm×50 mm
cut-off frequency at 3 dB bandwidth in frequency response characteristics: 650 Hz
(4) optical divider 33 of fiber fused type optical couple
dividing ratio: 10:1
(5) photodiode 35
InGaAs-PIN photodiode
(6) equalizing amplifier 36 of Gays electric field type transistor type AGC (Automatic Gain Control) amplifier
bnad: 8 GHz
dynamic range: 25 dB
(7) coils 61, 62 and 63
resistance value: 110 Ω for each coil
current to be consumed in operation: 20 to 40 mh
(8) oscillator 82.
modulation frequency: 1 KHz The optical fiber amplifier 31 which is the Er-doped optical fiber amplifier comprising an excitation light source of a 1.48 μm semiconductor laser, a current of which is controlled by the signal level-detecting circuit 39, so that a light-receiving power of the signal light in the photodiode 35 is −6 dB.

As explained before, the modulation frequency of the oscillator 82 is set to be higher than the 3 dB cut-off frequency of the optical wavelength-tuning filter 32, so that a response speed of the control circuit 40 becomes much higher to make it possible that the tracking control of a signal light is carried out with approximately 100 ms. In addition, a narrow bandpass filter having a bandpass width of 0.2 nm is used for the optical wavelength-tuning filter 32, so that a receiving sensitivity as high as −39 dBm is obtained in the optical receiver board 1, when a signal light of 10 Gb/s is received therein.

Next, the effectiveness of an optical receiver board in the invention is confirmed as explained below.

The thermal control of a semiconductor laser which is a light source for a signal light of 10 Gb/s is stopped to operate it at the free-run state, at which time-dependency of the light-receiving characteristics in the optical receiver board 1 are measured. In this measurement, it is confirmed that the receiving sensitivity of −39 dBm is stably kept. A similar confirmation is performed by using an optical filter having a bandpass width of 3 nm. The result is that the receiving sensitivity is −32 dBm which is deteriorated as compared to that in the first preferred embodiment by 7 dB. In the same manner, when an optical filter having a bandpass width of 0.5 nm is used, the receiving sensitivity is −37 dBm for the highest result. In this case, however, when a semiconductor laser of a light source for a signal light is in the free-run operation, the deterioration of more than 5 dBm is found as compared to the result in the preferred embodiment.

The optical receiver board 1 in the preferred embodiment may be modified as explained below.

(1) The multi-layered dielectric film filter for the optical wavelength-tuning filter 32 may be replaced by a glass filter doped with metal ions or rare earth ions or a liquid crystal.

(2) The permalloy magnet for the rotation portion 64 may be replaced by other materials such as pure iron or a coil.

(3) The number of coils mounted in the housing 66 for the rotation actuator 55 is not limited to three, but may be more than three.

(4) The coils 61 and 63 are not necessary to be connected in series, but may be driven independently.

(5) The saw-tooth sweep signal which is monotonously increased may be replaced by a sweep signal of another waveform such as a saw-tooth signal which is monotonously decreased.

(6) DSP (digital signal processor), etc. may be applied to the control circuit 40.

(7) The optical amplifier is not limited to use the Er-doped optical fiber amplifier, but may be one of an optical fiber amplifier doped with Pr or other materials, a solid laser amplifier, and a semiconductor laser amplifier.

(8) When the number of stages at which optical dividers are provided is increased, optical fiber amplifiers may be provided at following stages of the optical dividers.

(9) The optical-to-electrical converter is not limited to an InGaAs-PIN photodiode or a GaAs electric field transistor type amplifier, but may be one of an avalanche photodiode, a Si bipolar transistor, etc.

Next, an optical wavelength-tuning filter module in the first preferred embodiment according to the invention will be explained.

Figure 18:
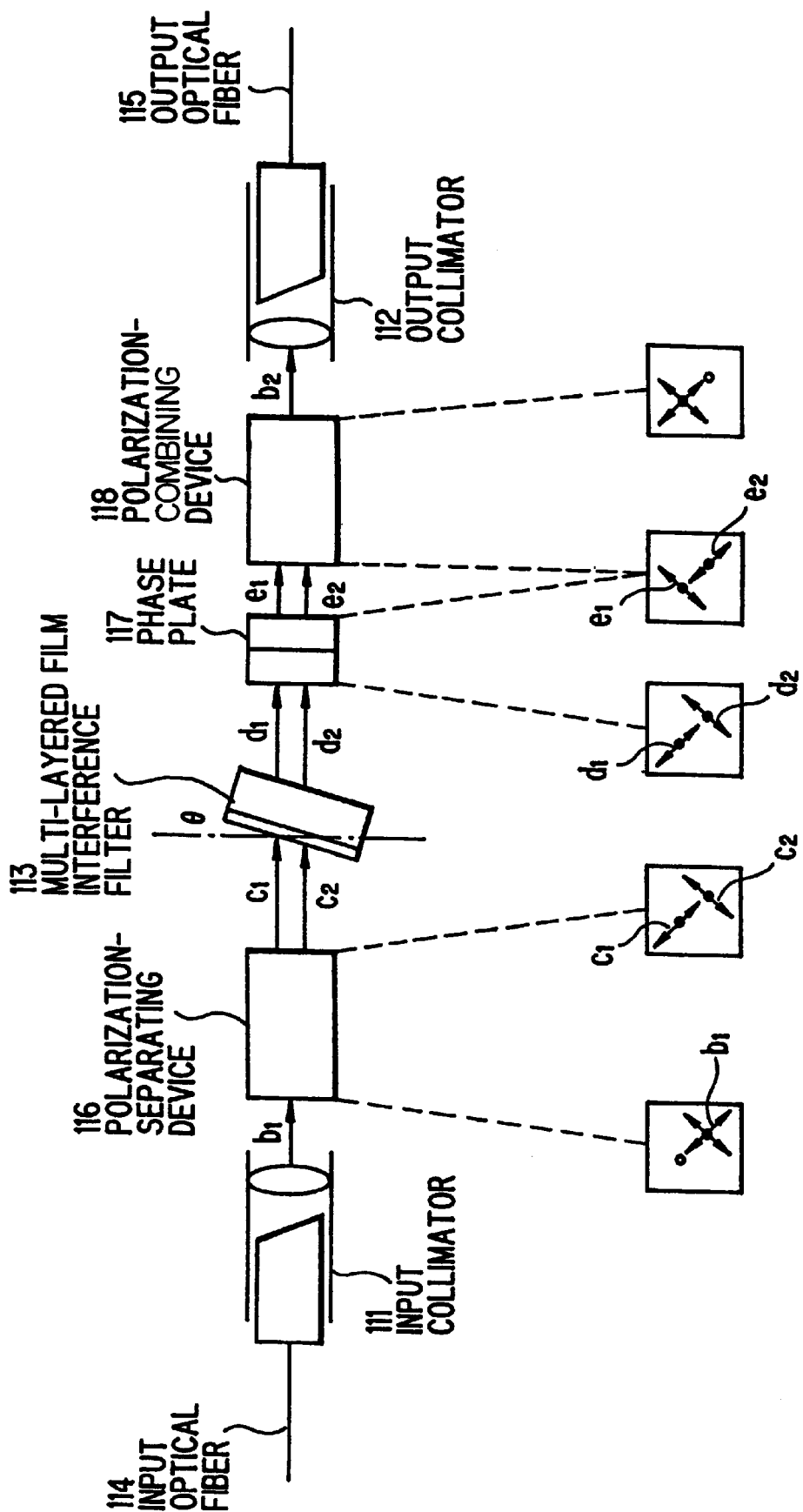
FIG. 18 is an explanatory diagram showing an optical wavelength-tuning filter module in the first preferred embodiment according to the invention.

FIG. 18 shows the optical wavelength-tuning filter module which comprises input and output collimators 111 and 112, a polarization-separating device (for which a polarization splitter is used) 116, a transmission type interference filter (multi-layered film interference filter 113, a phase plate 117, and a polarization-combining device (for which a polarization splitter is used) 118, and shows axes of a signal light and polarization planes thereof at input and output planes of the polarization-separating device 116, the phase plate 117, and the polarization-combining device 118 by using small circles and arrows in blocks arranged along the horizontal line at the lower portion therein.

The input collimator 111 receives a wavelength multiplexed signal light from the input optical fiber 114 to collimate it as shown therein by "$b_1$", and is composed of a single mode optical fiber and a lens fixed to the tip thereof. A diameter of the collimated signal light $b_1$ is set to be preferably 100 to 1000 μm. The input optical fiber 114 is connected to a light source (not shown) for emitting the wavelength-multiplexed signal light, and is a single mode optical fiber which may be replaced by a dispersion shift optical fiber or another type of an optical fiber. The output collimator 112 is the same as the input collimator 111, but is arranged in the opposite direction thereto to be connected to an output optical fiber 115. The input and output collimators 111 and 112 are preferably mounted on stages which move in the directions of a line parallel to the axis of the signal light and two lines orthogonal to each other and to the axis of the signal light. The collimated signal light $b_1$ has a polarization state such as a circular or elliptical polarization state which is a mixture of P and S polarizations. Where the amplitudes of P and S polarizations are equal, the circular polarization is obtained. In fact, however, P and S polarizations are usually different in amplitude, so that the elliptical polarization is obtained.

The polarization-separating device 116 separates first and second polarizations $c_1$ and $c_2$ having polarization planes which are obtained by rotating polarization planes of P and S polarizations of the collimated signal light $b_1$ in the same direction by 40 to 50 degrees, preferably, 45 degrees. The polarization-separating device 116 is of calcite having a crystal axis arranged to be 40 to 50 degrees, preferably, 45 degrees relative to P or S polarization plane. A separation width of the first and second polarizations $c_1$ and $c_2$, that is, a distance difference of transmission positions of the first and second polarizations $c_1$ and $c_2$ at the output end plane of the polarization-separating device 116 is preferably set to be approximately 200 to 300 μm by adjusting a length of the polarization-separating device 116 in the direction of the signal light path. The polarization-separating device 116 is coated with anti-reflection film relative to air, and is mounted on a fine movement stage which moves in the directions of a line parallel to the light path and two lines orthogonal to each other and to the light path.

The transmission type interference filter 113 is variable in an inclination angle θ of a light-receiving plane relative to an incident light to transmit a signal light of a predetermined wavelength band selected from a wavelength multiplexed signal light to the side of the output collimator 112. The transmission type interference filter 113 is a multi-layered film interference filter which is composed of high and low refractive index dielectric thin films of 40 to 50 layers stacked alternately, and the inclination angle θ is adjusted by a drive mechanism such as a pulse motor. The transmission type interference filter 113 is preferably mounted on a fine movement stage which moves in the directions of a line parallel to the light path of the collimated signal light $b_1$ and two lines orthogonal to each other and to the light path of the collimated signal light $b_1$. The transmission interference filter 113 is of the characteristics of uniform distribution on planes, for which a transmission loss and a transmission center wavelength are not changed, even if an incident position of the signal light on an incident plane is changed. The first and second polarizations $c_1$ and $c_2$ of the wavelength multiplexed signal light supplied from the polarization-separating device 116 are incident to the transmission interference filter 113, from which first and second polarizations $d_1$ and $d_2$ of a specific wavelength band $\lambda_1$ are supplied to the phase plate 117. The polarization states of the signal light are not changed, when it is transmitted through the transmission type interference filter 113.

The phase plate 117 rotates the polarization planes of the first and second polarizations $d_1$ and $d_2$ supplied from the transmission interference filter 113 with a rotation angle of 90 degrees to provide first and second polarizations $e_1$ and $e_2$. The phase plate 117 is preferably a half wavelength plate of quartz which is arranged to have its crystal axis in a range of ±5 degrees relative to the same direction as the polarization plane of S polarization, and is preferably coated with an anti-reflection film relative to air. The phase plate 117 is preferably mounted on a fine movement stage which moves in the directions of a line parallel to the light path of the collimated signal light $b_1$ and two lines orthogonal to each other and to the light path of the collimated signal light $b_1$. The phase plate 117 is structured, such that the direction of one polarization plane is changed to the direction of the other polarization plane in accordance with the rotation of the polarization planes of the first and second polarizations $d_1$ and $d_2$. Accordingly, an angle of the polarization plane of S polarization relative to the crystal axis direction of the half wavelength plate is adequately set in the above described range in accordance with the polarization planes of the supplied first and second polarizations $d_1$ and $d_2$.

The polarization-combining device 118 combines the first and second polarizations $e_1$ and $e_2$, and has the same structure as that of the polarization-separating device 116. As described before, the polarization-combining device 118 is preferably of calcite having its crystal axis arranged in a range of 40 to 50 degrees, preferably, 45 degrees relative to the polarization plane of P or S polarization, and has the same direction of the crystal axis and the same device length as those of the polarization-separating device 116. The polarization-separating and combining devices 116 and 118 are not limited to calcite, but may be replaced by rutile crystal, birefringence crystal such as LN crystal, etc., LPS (Laminated Polarization Splitter), etc. LPS is a polarization splitter which is composed of thin films of different refractive indices alternately laminated to provide a structure having different refractive indices for P and S polarizations. The polarization-combining device 118 is coated with anti-reflection film relative to air, and is mounted on a fine movement stage which moves in the direction of a line parallel to a light path of the collimated signal light $b_1$ and two lines orthogonal to each other and to the light path of the collimated signal light $b_1$.

The polarization plane of the polarization $e_1$ supplied to the polarization-combining device 118 which is inherent to the first polarization $c_1$ supplied from the polarization-separating device 116 is in the same direction as the polarization plane of the first polarization $c_1$ at the time when it is radiated from the polarization-separating device 116, and the polarization plane of the polarization $e_2$ supplied to the polarization-combining device 118 which is inherent to the second polarization $c_2$ supplied from the polarization-separating device 116 is in the same direction as the polarization plane of the second polarization $c_2$ at the time when it is radiated from the polarization-separating device 116. Accordingly, the light coupling occurs in the polarization-combining device 118 in the reverse direction to the light separation in the polarization-separating device 116, so that the radiated signal light $b_2$ is of a circular or elliptical polarization state which is obtained in accordance with the coupling of the two polarizations $e_1$ and $e_2$.

In this optical wavelength-tuning filter module which is structured as explained above, the collimated light $b_1$ of the wavelength multiplexed signal light is transmitted through the transmission type interference filter 113 at the state where the collimated signal light $b_1$ is split into two signal lights of two polarization planes having an angle of 45 degrees relative to polarization planes of P and S polarizations, and the two lights are then combined to provide the signal light $b_2$, so that the occurrence of PDL is effectively avoided.

In more detail, an angle between the polarization plane of the first polarization $c_1$ and the polarization plane of s polarization, and an angle between the polarization plane of the first polarization $c_1$ and the polarization plane of P polarization are 45 degrees to provide a ratio of 1:1 between S and P polarization components for the first polarization. When the polarization state of the collimated signal light $b_1$ is changed, namely, a light intensity ratio of S and P polarizations of the collimated signal light $b_1$, the ratio of 1:1 between the S and P polarization components is not changed, although a light intensity of the first polarization $c_1$ is changed. Thus, a transmission loss is a mean value of first and second transmission losses, when the first polarization $c_1$ is transmitted through the transmission type interference filter 113, in accordance with the assumption that the first transmission loss is a transmission loss where the first polarization $c_1$ is only of S polarization, and the second transmission loss is a transmission loss where the first polarization $c_1$ only of P polarization. Although the transmission loss is changed in accordance with the change of the light intensity of the first polarization $c_1$, the ratio between S and P polarizations is constantly 1:1 to result in no occurrence of PDL.

The same discussion is repeated for the second polarization $c_2$. Namely, a transmission loss is a mean value of first and second transmission losses, when the second polarization $c_2$ is transmitted through the transmission type interference filter 113, in accordance with the assumption that the first transmission loss is a transmission loss where the second polarization $c_2$ is only of S polarization, and the second transmission loss is a transmission loss where the second polarization $c_2$ is only of P polarization. Although the transmission loss is changed in accordance with the change of the light intensity of the second polarization $c_2$, the ratio between S and P polarizations is constantly 1:1 to result in no occurrence of PDL.

The transmission type interference filter 113 has uniform characteristics on its planes to provide no change in a transmission loss and a center wavelength of a transmission wavelength bandwidth, even if an incident position of a signal light to an incident plane of the transmission type interference filter 113 is changed, so that a transmission loss of the first and second polarizations $d_1$ and $d_2$ coupled after the transmission of the transmission type interference filter 113 is a total value of transmission losses of the first and second polarizations $c_1$ and $c_2$ in the transmission type interference filter 113, if it is assumed that a loss is zero in an optical system excluding the transmission type interference filter 113. As explained above, no PDL occurs in a transmission loss of the signal light $b_2$, because no PDL occurs, when the first and second polarizations $c_1$ and $c_2$ transmit through the transmission type interference filter 113.

The first and second polarizations $d_1$ and $d_2$ of a specific wavelength $\lambda_1$ radiated from the transmission type interference filter 113 are rotated in polarization plane with a rotation angle of 90 degrees to be combined in the polarization-combining device 118.

In the optical wavelength-tuning filter module as described above, PDL is suppressed to be less than 0.2 dB in the whole structure of this module, so that an intensity of an output light of the output collimator 112 is stabilized, even if a wavelength of a transmitted light is changed by changing an inclination angle θ of the transmission type interference filter 113.

Usually, light paths of polarizations radiated from the transmission type interference filter 113 are changed, when the inclination angle θ thereof is changed to change a wavelength bandwidth of a transmitted light. In the optical wavelength-tuning filter module in the preferred embodiment, however, operation and effect are not changed even by the change of the light paths, so that a stabilized output light is obtained, even if the inclination angle θ is changed. In addition, the two polarizations $c_1$ and $c_2$ split in the polarization-separating device 116 transmit commonly through the transmission type interference filter 113, the phase plate 117 and the polarization-combining device 118, so that no error occurs between the two polarizations $c_1$ and $c_2$. Consequently, the precision of an output light is high, and it is easy to adjust optical parts in this module. Further, the occurrence of PDL is largely suppressed simply by adding a polarization-separating device, a phase plate, and a polarization-combining device to a conventional optical filter module in which a transmission type interference filter is positioned between two opposite optical systems. Therefore, the number of parts is relatively small to reduce module cost and to make the adjustment among optical parts easy.

In the preferred embodiment, the phase plate 117 is positioned between the transmission type interference filter 113 and the polarization-combining device 118, but it may be positioned between the polarization-separating device 116 and the transmission type interference filter 113 to provide the same operation and result.

In such a case, where the polarization planes of the two polarizations $C_1$ and $C_2$ split in the polarization-separating device 116 and are preferably arranged to have an angle of 45 degrees relative to the polarization planes of P and S polarizations, PDL is suppressed to be less than 0.1 dB in the whole structure of this module.

In some uses of the optical wavelength-tuning filter module, it is not necessary to suppress PDL to such an extent. In this case, an angle of the polarization planes of the polarizations $C_1$ and $C_2$ relative to the polarization planes of P and S polarizations may be in a range of 45 degrees with a tolerance of ±5 degrees.

Next, a concrete example of the optical wavelength-tuning filter module in the preferred embodiment will be explained in FIG. 18.

The input collimator such as an optical fiber collimator is connected via an input optical fiber 114 to a light source (not shown) of a wavelength-tuning laser which emits a laser light having a wavelength of 1530 to 1570 nm, wherein a polarization state of the laser light is controlled by an optical fiber type polarization controller (not shown), and the polarization state-controlled laser light is supplied via the optical fiber 114 to the input optical fiber collimator 111. A collimated light having a beam diameter of 0.18 mm is radiated from the input collimator 111. The output collimator 112 is connected via an output optical fiber 115 to a measurement system (not shown) in which a center wavelength of an output light transmitted through the wavelength-tuning filter module is measured by an optical spectrum analyzer, and PDL is measured by a power meter.

Polarization splitters of calcite having a crystal axis arranged with an angle of 45 degrees relative to the polarization planes of S and P polarizations are used for the polarization-separating and combining devices 116 and 118, wherein a separation width of the polarization-separating device 116 is 0.4 mm by setting a length of the polarization-separating device 116 to be a predetermined value.

A half wavelength plate of quartz having a crystal axis arranged in the same direction as the polarization plane of S polarization is used for the phase plate 117.

A multi-layered film interference filter having $Ta_2O_5$ and $SiO_2$ thin films alternately stacked on a glass substrate is used for the transmission type interference filter 113.

The characteristics of the multi-layered film interference filter are that a half value width is 0.3 nm, and a transmission loss is 0.3 dB, when a signal light is vertically supplied to its input plane, and a center wavelength of the signal light radiated vertically from its output plane is 1571 nm.

The multi-layered film interference filter is fixed to a rotating shaft of a pulse motor to adjust the inclination angle θ of the input plane, and the input optical fiber collimator 111, the polarization splitters 116 and 118, the multi-layered film interference filter 113, and the half wavelength plate 117 are mounted on fine movement stages which move in three axes orthogonal to each other.

In measurement, a collimated light $b_1$ is vertically supplied to the input plane of the multi-layered film interference filter 113, and the input optical fiber collimator 111, the polarization splitters 116 and 118, the multi-layered film interference filter 113, and the half wavelength plate 117 are finely adjusted in position along the three orthogonal axes to suppress total transmission losses in this module to be less than 2 dB.

Next, a lasing wavelength of the wavelength-tuning laser and the inclination angle θ of the multi-layered film interference filter 113 are adjusted for an output light of the output collimator 112 to have a center wavelength of 1570 nm. Then, an intensity of the output light radiated from the output collimator 112 is measured in cases where the polarization state of the collimated light $b_1$ radiated from the input optical fiber collimator 111 is only of P polarization for the first case, and is only of S polarization for the second case, respectively, in accordance with the polarization control of the polarization controller. Then, a difference of the output light intensities in the first and second cases which is identical to PDL is measured. The result is that PDL is 0.06 dB, when the center wavelength of a transmission light is 1570 nm.

In the same manner, a lasing wavelength of the wavelength-tuning laser and the inclination angle θ of the multi-layered film interference filter 113 are adjusted for a transmission light radiated from the output collimator 112 to have center wavelengths of 1530, 1535, 1540, 1545, 1550, 1560, and 1565 nm. Then, PDL is measured at each of the center wavelengths.

Figure 19:
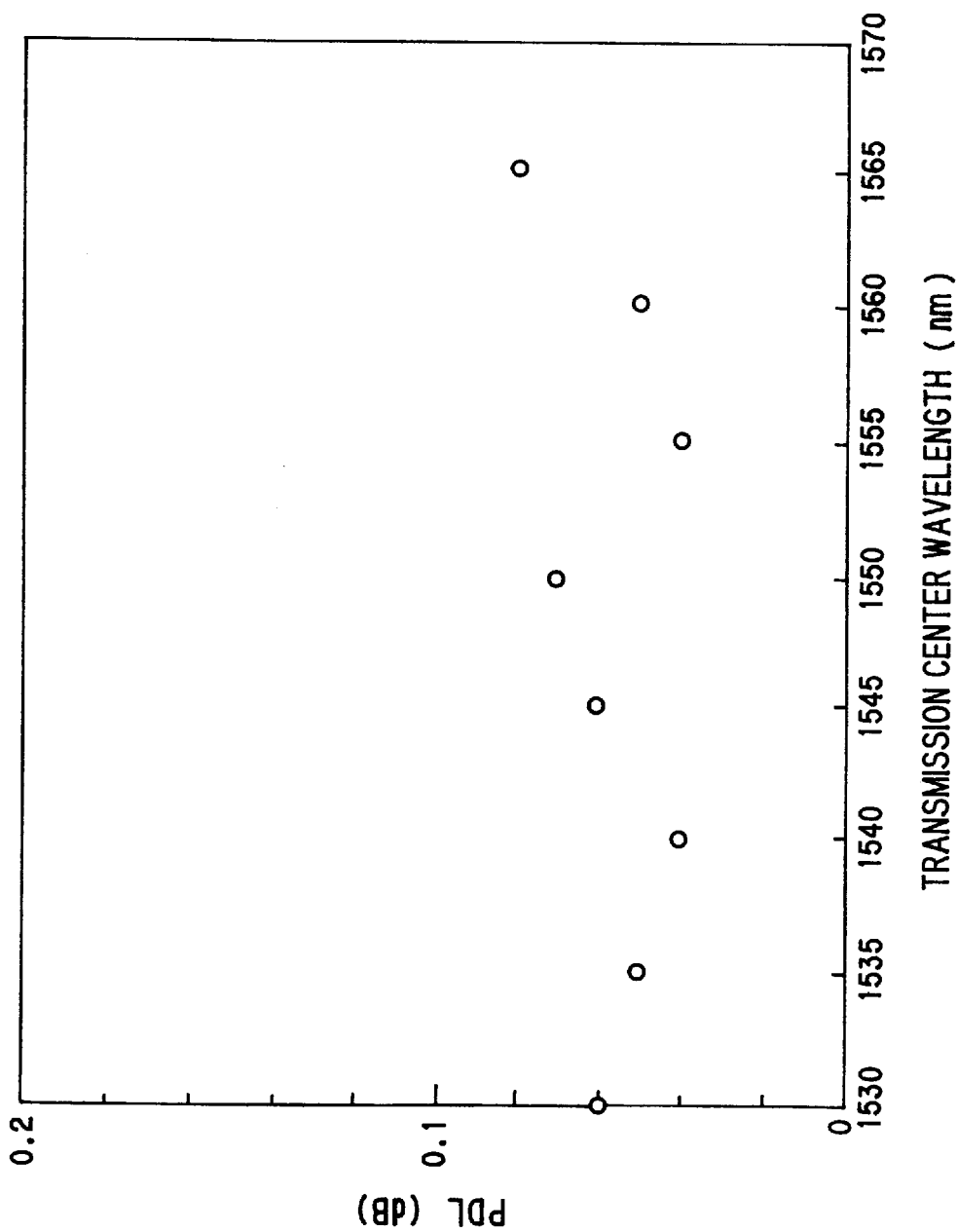
FIG. 19 is a graph showing PDL relative to the transmission center wavelength of a signal light in the optical wavelength-tuning filter module in the first preferred embodiment.

FIG. 19 shows the results of the measurement as described above. AS apparent from the results shown in FIG. 19, PDL is less than 0.1 dB in the range of 1530 to 1570 nm.

Figure 20:
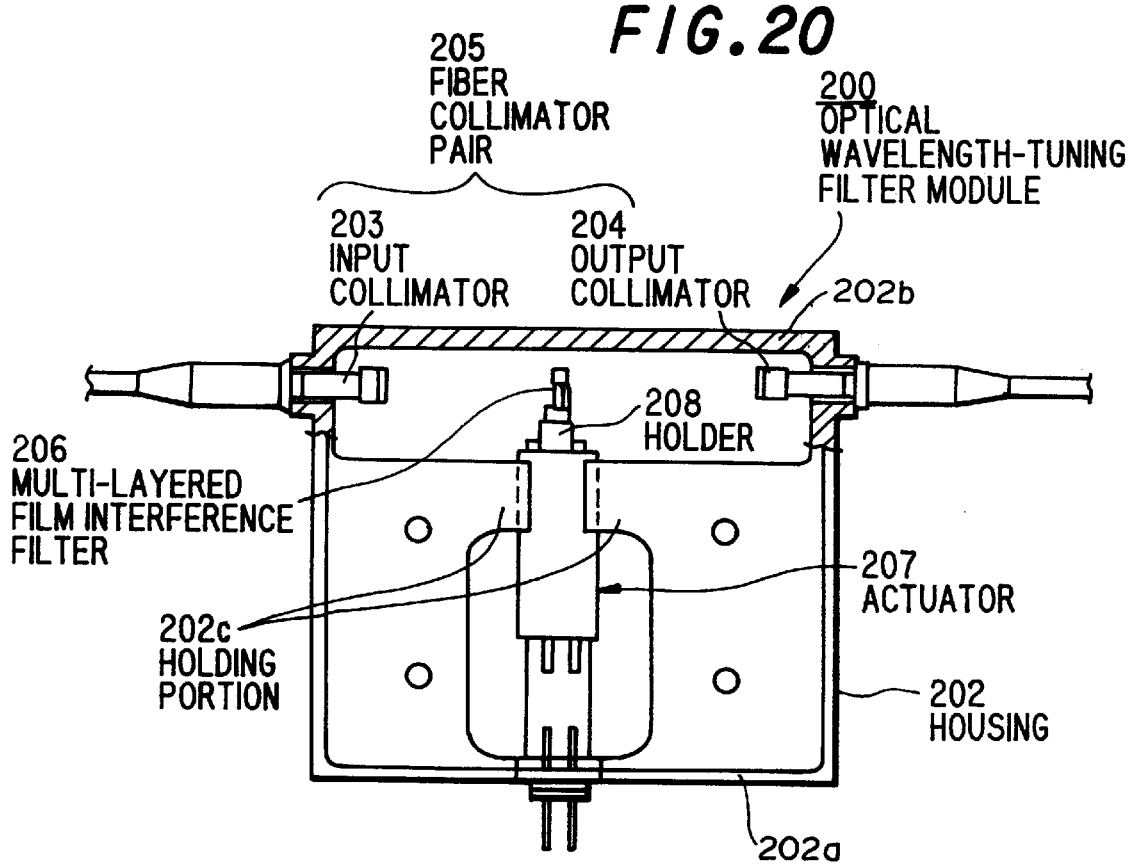
FIG. 20 is a cross-sectional view taken along a vertical line in an optical wavelength-tuning filter module in the second preferred embodiment according to the invention.
Figure 21:
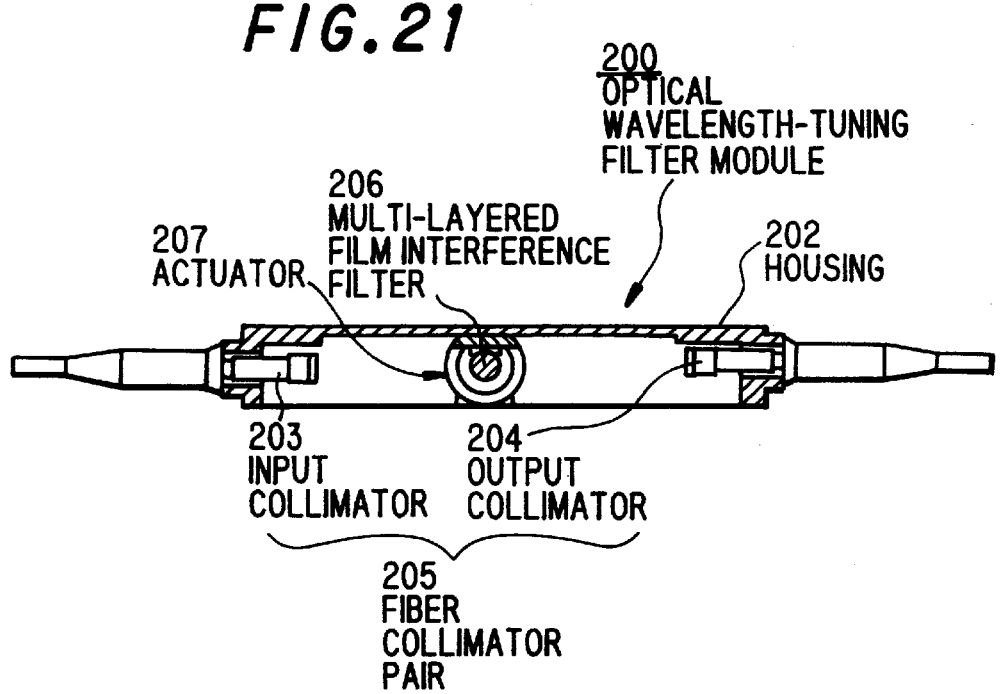
FIG. 21 is a cross-sectional view taken along a horizontal line in the optical wavelength-tuning filter module in the second preferred embodiment.

Next, an actuator for an optical wavelength-tuning filter module in the first preferred embodiment according to the invention will be explained in FIGS. 20 and 21.

The optical wavelength-tuning filter module 200 comprises a module housing 202, an optical fiber collimator pair 205 consisting of an input collimator 203 and an output collimator 204 extending through the walls of the module housing 202, a multi-layered film interference filter 206 provided between the input and output collimators 203 and 204, and an actuator 207 for controlling an inclination angle of the multi-layered film interference filter 206 relative to a collimated light supplied from the input collimator 203 to the output collimator 204. The module housing 202 is composed of a main body 202a and a lid 202b which are made of stainless steel or Koval (Trademark) and preferably plated with nickel or gold for air-tight sealing. For the necessity of air-tight sealing by seam welding, an outer periphery of the lid 202b to be welded to the main body 202a has a thickness of, for instance, approximately 100 μm.

The input and output collimators 203 and 204 are adjusted in optical coupling characteristics therebetween with high precision to be less than 0.5 dB for loss and to be more than 50 dB for return loss, and then welded to the module housing 202.

The optical fiber collimator pair 205 comprises 1.3 μm bandwidth single mode optical fibers at the input and output ends and non-spherical lenses having a focal length of 1.8 mm optically coupled to the 1.3 μm bandwidth single mode optical fibers for collimating a light transmitted therebetween at the light transmitting and receiving ends. In addition, the end planes of the 1.3 μm bandwidth single mode optical fibers are air-tightly sealed in accordance with the metalization treatment on the surfaces of the single mode optical fibers and the subsequent metal sealing of a low melting metal.

The multi-layered film interference filter 206 is a multi-layered dielectric film interference filter which is composed of high refractive index dielectric thin films and low refractive index dielectric thin films of approximately 40 to 50 layers alternately stacked on a glass substrate, and is held by a filter holder 208 which is fixed on the top of the actuator 207.

The actuator 207 is directly supported by holding portions 202c provided to be projected into the main body 202a of the module housing 202.

Figure 22:
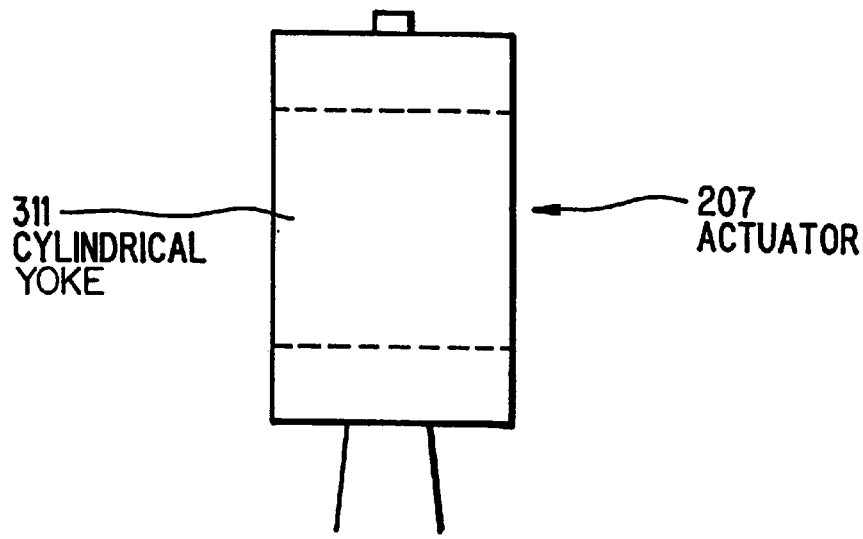
FIG. 22 is a side view showing an actuator in the optical wavelength-tuning filter module in the second preferred embodiment.
Figure 23:
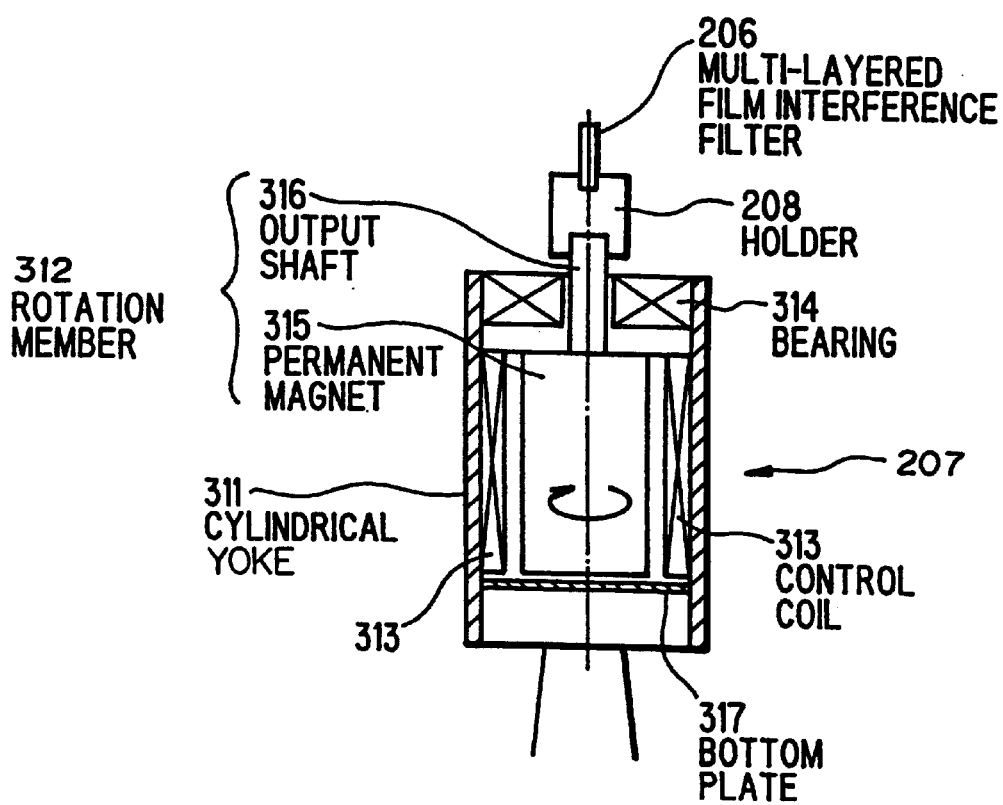
FIG. 23 is a cross-sectional view taken along a vertical line in the actuator in the optical wavelength-tuning filter module in the second preferred embodiment.

FIGS. 22 and 23 show the actuator 207 which comprises a cylindrical yoke 311 closed at the bottom by a bottom plate 317, a circular rod-shaped rotation member 312 provided coaxially with the cylindrical yoke 311 in the inside thereof and connected with the multi-layered film interference filter 206, and arcuate control coils 313 provided along an inner periphery of the cylindrical yoke 311 to control an inclination angle of the circular rod-shaped rotation member 312.

The cylindrical yoke 311 is not only a container for the control coils 313 and the rotation member 312, but also a return yoke of a magnetic circuit. For this purpose, the cylindrical yoke 311 is made of Permalloy to improve the hysterisis characteristics for the return yoke of the magnetic circuit.

The rotation member 312 is supported at its one end relative to the cylindrical yoke 311 by a bearing 314 which comprises a number of balls held by an inner and an outer segment. The inner and the outer segments are fixed by a retainer on the condition that they are preloaded to be forced in the direction of an axial line of the balls. For this structure, the bearing arranged in place is of high precision to have no deviation in the radial and thrust directions. The inner of the bearing 314 is fixed to an output shaft 316 of the rotation member 312 by a fixing material such as adhesive, etc.

The circular rod-shaped rotation member 312 comprises a circular rod-shaped permanent magnet 315, to which the output shaft 316 having a diameter smaller than that of the permanent magnet 315 is fixed on a common axis.

Figure 24:
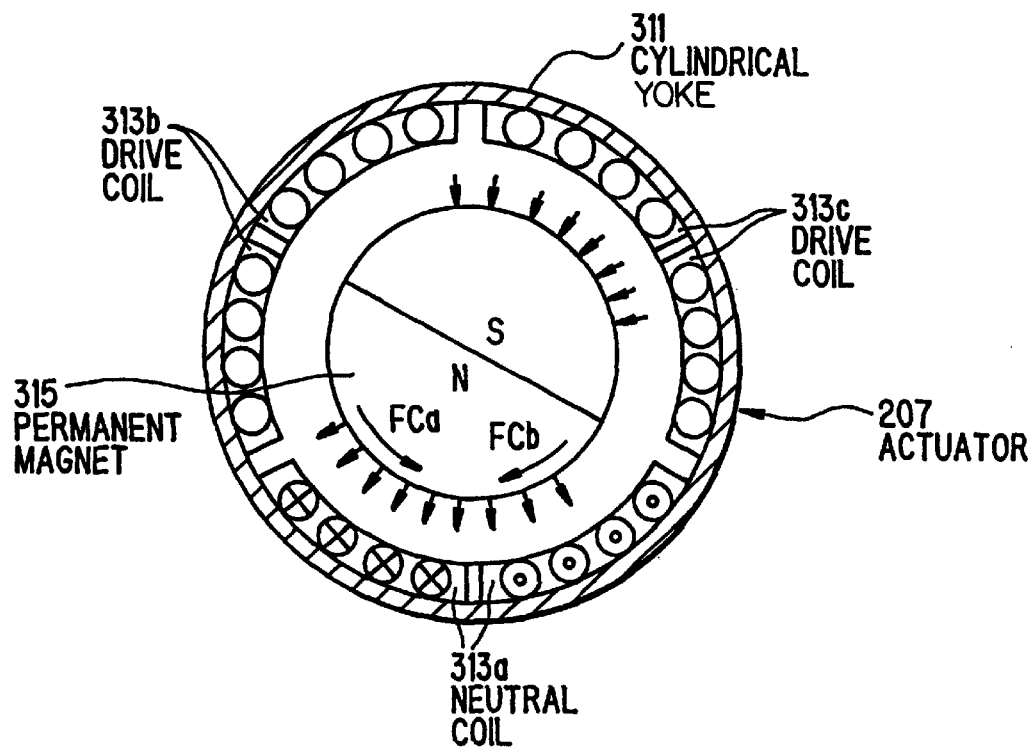
FIGS. 24 and 25 are cross-sectional views taken along a horizontal line in the actuator in the optical wavelength-tuning filter module in the second preferred embodiment, and showing operation of the actuator.
Figure 25:
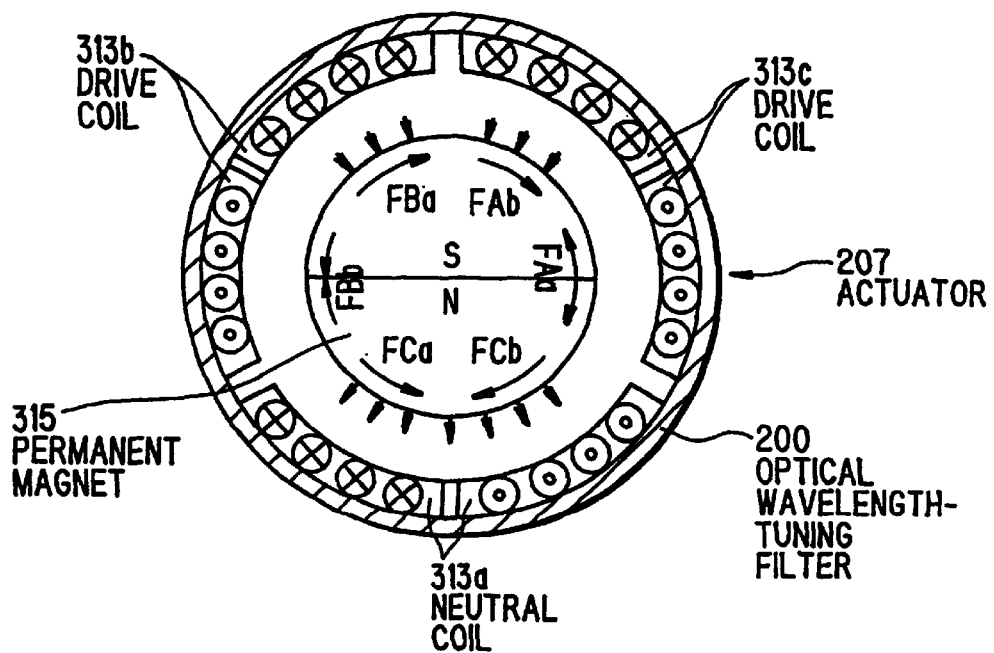
Figure 26:
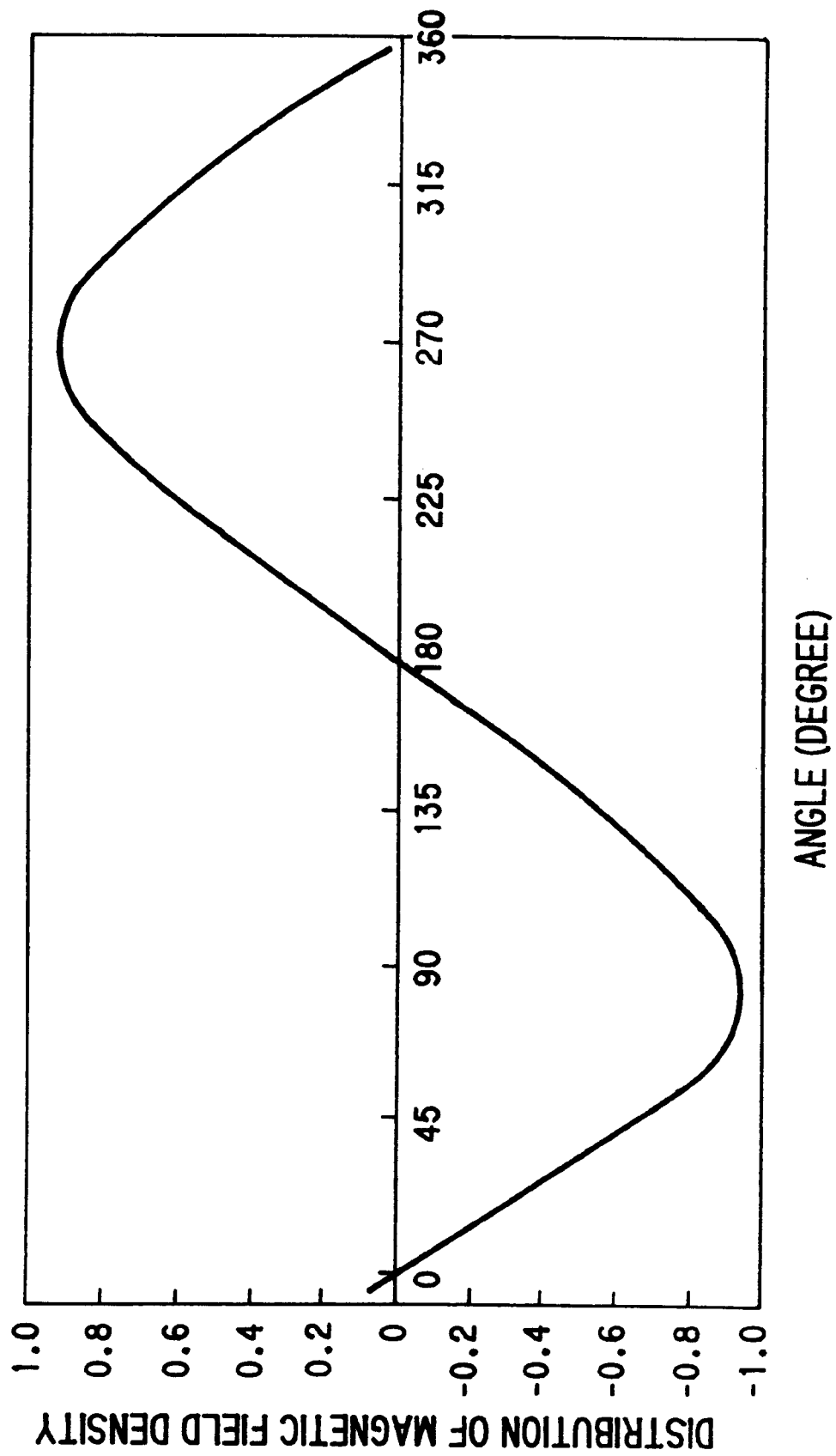
FIG. 26 is a graph showing the surface magnetic field density distribution of a rotor in the actuator in the optical wavelength-tuning filter module in the second preferred embodiment.

FIGS. 24 and 25 show the actuator 207 which comprises the permanent magnet 315, and the control coils 313 of a neutral coil 313a, and drive coils 313b and 313c, respectively, contained in the cylindrical yoke 311. The permanent magnet 315 is polarized to represent N and S polarities, and has a surface magnetic field density of the sine curve, on an outer periphery thereof shown in FIG. 26, such that the magnetic flux is maximum in the center of each polarized regions of the permanent magnet 315, and zero at the angle of 90 degrees on the left and right sides relative to the center.

The neutral and drive coils 313a, 313b and 313c are wound on air space cores, and shaped to be arcuate in conformity with the inner surface of the cylindrical yoke 311. In the preferred embodiment, although the coils 313a, 313b and 313c are fixed with equal interval to the inner wall of the cylindrical yoke 311, they may be shifted in the direction of a rotating axis, as long as they are provided in an effective range of the permanent magnet 315.

Figure 27:
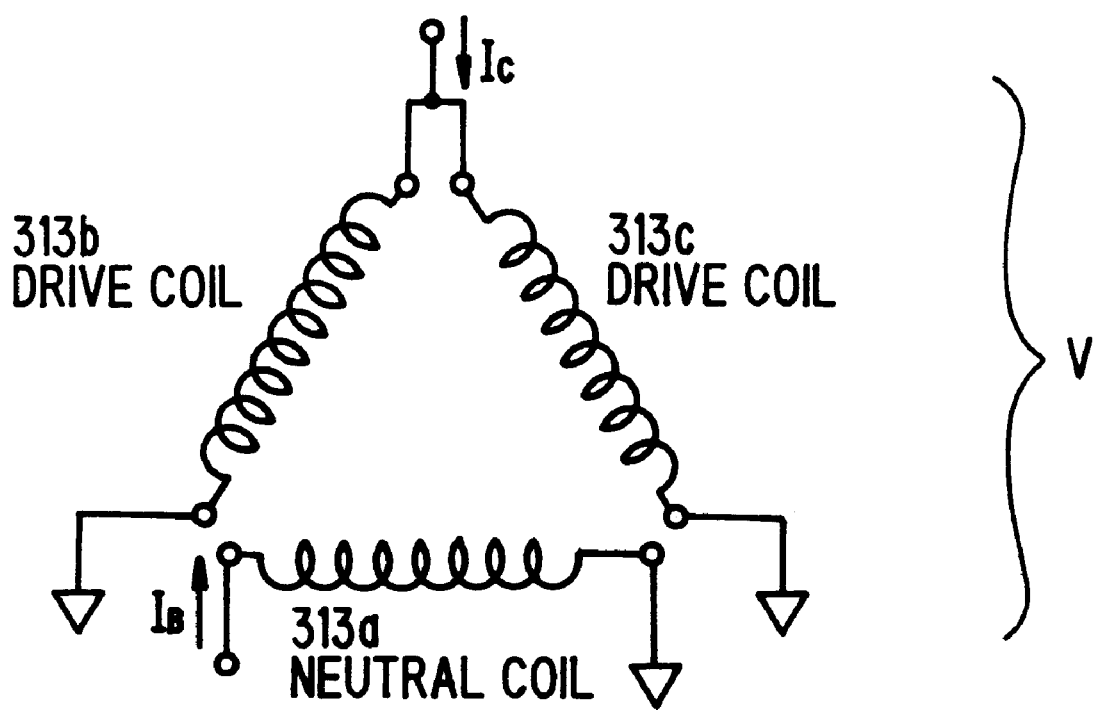
FIG. 27 is an explanatory diagram showing control coils in the actuator in the optical wavelength-tuning filter module in the second preferred embodiment.

FIG. 27 shows the neutral coil 313a, and the drive coils 313b and 313c connected in parallel to be driven independently of the neutral coil 313a.

In operation of the actuator 207 for the wavelength-tuning filter module 200 as explained above, it is assumed that the rotation member 312 and the multi-layered film interference filter 206 are not known in rotating position. At first, a current $I_B$ is flown through the neutral coil 313a. At this time, it is assumed that the rotating position of the permanent magnet 315 is one as shown in FIG. 24. In such a case, the permanent magnet 315 starts rotating in the counter-clockwise direction, because the left side portion of the neutral coil 313a is exposed to a magnetic field larger than that exposing the right side portion thereof to make a rotating force FCa for rotating the rotation member 312 in the counter-clockwise direction larger than a rotating force FCb for rotating it in the clockwise direction. Then, the rotation member 312 stops rotating to take a position as shown in FIG. 25, when the rotating force FCa is equal to the rotating force FCb (FCa=FCb). At this time, a magnetic circuit is closed in accordance with the flow of magnetic flux from N pole of the permanent magnet 315 via neutral coil 313a and the cylindrical yoke 311 to S pole of the permanent magnet 315.

In order to rotate the rotation member 312 and the multi-layered film interference filter 206 coupled thereto in the clockwise direction in FIG. 25, currents must be flow through the neutral and drive coils 313a, 313b and 313c as shown therein.

In FIG. 25, it is assumed that the rotating forces of the counter-clockwise direction and the clockwise direction which are generated on the N pole side of the permanent magnet 315 are FCa and FCb in the same manner as in FIG. 24, in accordance with a current which flows through the neutral coil 313a, and that the rotating forces of the clockwise direction and the counter-clockwise direction which are generated on the S pole side of the permanent magnet 315 are FBa and FAb, and the rotating forces generated at the boundary regions of the N and S poles of the permanent magnet 315 are FBb and FAa, respectively, in accordance with currents which flow through the drive coils 313b and 313c, wherein FAb , FBa and FCb are in the clockwise direction, and FCa is in the counter-clockwise direction, while FAa and FBb are negligible, because these rotating forces are across the N and S boundary regions, and changed in direction. Thus when the currents flow through the control coils 313a, 313b and 313c, the sum of FAb , FBa and FCb (FAb+FBa+FCb) becomes greater than FCa to rotate the permanent magnet 315 in the clockwise direction. Then, the permanent magnet 315 stops rotating, when (FAb+FBa+FCb) is equal to FCa.

In order to rotate the rotation member 312 in the counter-clockwise direction in FIG. 25, currents of the reverse direction to those shown in FIG. 25 flow through the drive coils 313b and 313c. Consequently, (FAb+FBa+FCb) becomes greater than FCa to rotate the permanent magnet 315 in the counter-clockwise direction, and, when (FAb+FBa+FCb) is equal to FCb, the permanent magnet 315 stops rotating.

As explained above, an inclination angle of the multi-layered film interference filter 206 relative to an input signal light is controlled to be changed in accordance with the change in direction and magnitude of currents flown through the control coil 313a, 313b and 313c, so that a signal light of a predetermined wavelength selected from a wavelength multiplexed signal light is radiated from the multi-layered film interference filter 206 to a light receiving side.

The actuator 207 operates in such a manner that the rotation member 312 rotates in the both directions by controlling currents to flow through the control coils, so that the size becomes small, an operative voltage becomes low, and the reliability becomes high as compared to a conventional piezo-electric type actuator. In addition, the rotation member 312 rotates without any contact with a third member, so that the durability is enhanced as compared to a conventional actuator. When an AC current is added to a DC current flown through the control coils, the multi-layered film interference filter 206 is controlled with appropriate swing movement. In the invention, the permanent magnet 315 is used to eliminate the use of electrical interconnection which is necessary for electrical magnets, so that the reliability becomes high due to no occurrence of electrical leads to be broken.

The rotation member 312 is supported on one side thereof by the bearing 314, so that the rotation with high precision is realized as compared to a case where the rotation member 312 is supported on both sides thereof. In addition, the one side on which the rotation member 312 is supported is a side to which the multi-layered film interference filter 206 is fixed, so that the fluctuation in rotation of the multi-layered film interference filter 206 is suppressed. Further, the bearing 14 is structured to be applied with a predetermined pressure in the radial and thrust directions, so that the rotation member 312 is rotated smoothly, and the cylindrical yoke 311 is of Permalloy, so that the hysterisis characteristics are improved to provide a better frequency property. In addition, the neutral coil 313a, and the drive coils 313b and 313c are separately wired to eliminate the use of a negative power supply, so that any control is carried out only by using a positive power supply.

The actuator in the invention is not limited to be applied to the optical wavelength-tuning filter 200 as explained above, and the permanent magnet 315 may be polarized into four or more even-number divisional regions.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical receiver board, comprising:

an input port for receiving a signal light beam;

an optical wavelength-tuning filter for transmitting a wavelength component of a predetermined wavelength bandwidth of said signal light beam, means for controlling said optical wavelength-tuning filter to adjust a transmission center wavelength of said predetermined wavelength bandwidth; and means for converting said signal light beam of said wavelength component to an information electric signal to be output from the optical receiver board;

wherein said optical wavelength-tuning filter, comprises;

an optical filter member having a transmission profile of a single peak; and a magnet-rotating portion for fixing said optical filter member thereon, said magnet-rotating portion being spatially rotated in accordance with an electrical control carried out by said controlling means to change said transmission center wavelength.

2. The optical receiver board as defined in claim 1, wherein:

said optical wavelength-tuning filter receives said signal light beam which is amplified by an optical amplifier provided at a preceding stage of said optical wavelength-tuning filter.

3. The optical receiver board as defined is claim 1, wherein:

said input portion receives said signal light beam which is a wavelength multiplexed signal light beam; and said controlling means controls said optical wavelength-tuning filter to maximize a transmission factor for a signal light beam of said wavelength component selected from said wavelength-multiplexed signal light beam.

4. The optical receiver board as defined in claim 1, wherein;

said controlling means comprises means for generating a sweep signal to sweep said transmission center wavelength of said optical wavelength-tuning filter, said sweep signal including a DC component for tracking control of said optical wavelength-tuning filter, and an AC component having a frequency of fm for detection of an error signal in said tracking control.

5. The optical receiver board as defined in claim 4, wherein;

said sweep signal-generating means sets said frequency of fm for said AC component to be equal to or greater than a cut-off frequency of fc in frequency response characteristics of a rotating angle of said magnet-rotating portion of said optical wavelength-tuning filter relative to an electric signal in said electrical control carried out by said controlling means.

6. The optical receiver board as defined in claim 4, wherein:

said controlling means detects said AC component included in an electric signal to which a part of said signal light of said wavelength component is converted, and changes said DC component included in said sweep signal to minimize said AC component detected.

7. The optical receiver board as defined in claim 1, wherein:

said optical filter member has a rotating shaft connected to said magnet-rotating portion, said rotating shaft being parallel to a direction of a load by gravity.

8. An optical wavelength-tuning filter module, comprising:

an input collimator for collimating a wavelength multiplexed signal light to provide a collimated signal light beam;

a polarization-separating device for separating first and second polarizations having polarization planes which are obtained by rotating polarization planes of P and S polarizations of said collimated signal light in the same direction with a rotation angle of 40 to 50 degrees;

a transmission type interference filter having an optical filter member for receiving said signal light beam of first and second separated polarizations supplied from said polarization-separating device, an inclination angle of said optical filter member being variable relative to a light axis of said input collimator;

a phase plate for rotating said polarization planes of said first and second polarizations with a rotation angle of 90 degrees, said phase plate being provided on an input or output side of said transmission type interference filter;

a polarization-combining device for combining said polarization planes of said first and second polarizations transmitted through said transmission type interference filter and said phase plate; and an output collimator for receiving said signal light beam supplied from said polarization-combining device.

9. The optical wavelength-tuning filter module as defined in claim 8, wherein;

said transmission type interference filter is a multi-layered film interference filter.

10. The optical wavelength-tuning filter module as defined in claim 8, wherein:

said input and output collimators are input and output optical fiber collimators connected to input and output optical fibers.

11. The optical wavelength-tuning filter module as defined in claim 8, wherein;

said phase plate is a half wavelength plate arranged to have a crystal axis in the same direction as a polarization plane of S polarization or in a angle range of −5 to +5 degrees relative to said polarization of S polarization.

12. The optical wavelength-tuning filter module as defined in claim 8, wherein:

said polarization-separating device and said polarization-combining device are polarization splitters arranged to have crystal axes in an angle range of 40 to 50 degrees relative to a polarization plane of P polarization or S polarization.

13. An actuator for an optical wavelength-tuning filter module, comprising:

a rotating member having an output shaft, on one end of which is fixed an optical filter member which is a part of said optical wavelength-tuning filter module;

a cylindrical yoke for coaxially containing said rotating member; and arcuate control coils for adjusting an inclination angle of said optical filter member by rotating said rotating member, said arcuate coils being provided on an inner wall of said cylindrical yoke, and driven by a control signal.

14. The actuator as defined in claim 13, wherein:

said optical filter member is a multi-layered dielectric film interference filter.

15. The actuator as defined in claim 13, wherein:

said rotating member is supported at only one end by a bearing, said bearing being positioned between said rotating member and an inner wall of said cylindrical yoke.

16. The actuator as defined in claim 13, wherein:

said arcuate control coils are divided into first to third sections, said first section being a neutral coil, and said second and third sections being drive coils, such that said neutral coil and said drive coils are electrically separated.

17. An optical receiver board, comprising:

an input port for receiving a wavelength multiplexed signal light beam;

an optical amplifier for amplifying a signal light beam from said input port;

an optical wavelength-tuning filter module for transmitting a wavelength component of a predetermined wavelength bandwidth of an amplified signal light beam received from said optical amplifier;

said optical wavelength-tuning filter module further comprising:

an input collimator for collimating the amplified signal light beam to provide a collimated signal light beam;

a polarization separating device for separating first and second polarization planes, said polarization separating device rotating P and S polarization planes of said collimated signal light beam between 40–50 degrees in the same direction, said polarization separating device having a crystal axis relative to the P or S polarization planes of 40 to 50 degrees;

a transmission type interference filter for receiving a polarization separated signal light beam with first and second separated polarization planes supplied from said polarization separating device, said transmission type interference filter having an optical filter member with a transmission profile of a single peak at a transmission center wavelength, and an inclination angle of said optical filter member being variable relative to a light axis of said input collimator by a magnet-rotating portion being spatially rotated in accordance with an electrical control carried out by a control circuit to change said transmission center wavelength;

a half wavelength phase plate with a crystal axis in the same direction as the S polarization plane or in a angle range of −5 to +5 degrees relative to said S polarization plane for rotating said first and second separated polarization planes within said polarization separated signal light beam by a rotation angle of 90 degrees, said half wavelength phase plate being provided on an input or output side of said transmission type interference filter;

a polarization combining device identical in structure to said polarization separating device, for combining said first and second separated polarization planes of said polarization separated signal light beam transmitted through said transmission type interference filter and said half wavelength phase plate; and an output collimator for receiving a combined signal light beam supplied from said polarization combining device;

an optical divider for dividing the combined signal light beam transmitted by the optical-wavelength tuning filter module into first and second divided signal light beams;

a photodiode for converting said first divided signal light beam to a first electrical signal;

a photoreceptor for converting said second divided signal light beam to a second electrical signal;

a signal level detecting circuit for detecting said first electrical signal;

a control circuit for controlling said optical filter member of said optical wavelength-tuning filter module thereby adjusting a transmission center wavelength of said predetermined wavelength bandwidth in accordance with said second electrical signal and the output of said signal level detecting circuit;

said control circuit further comprising:

a bias circuit and an oscillator for generating a sweep signal to sweep said transmission center wavelength of said optical wavelength-tuning filter module, said sweep signal including a bias circuit generated DC component for tracking control of said optical wavelength-tuning filter module, and an oscillator generated AC component having a frequency of fm for detection of an error signal in said tracking control;

an equalizing amplifier for amplifying said first electrical signal; and a discrimination circuit for wave-shaping the amplified first electrical signal, for outputting as an information electric signal.

18. The optical receiver board as defined in claim 17, wherein;

said electrical control circuit sets said frequency of fm for said AC component to be equal to or greater than a cut-off frequency of fc in frequency response characteristics of a rotating angle of said magnet-rotating portion of said optical wavelength-tuning filter module relative to a control electrical signal from said electrical control circuit.

19. The optical receiver board as defined in claim 17, wherein;

said control circuit detects said AC component included in said second electrical signal, and changes said DC component included in said sweep signal to minimize said AC component detected.

20. An actuator for an optical wavelength-tuning filter module, comprising:

a rotating member having an output shaft on one end of which is fixed an optical filter member;

a cylindrical yoke coaxially containing said rotating member; and arcuate control coils for adjusting an inclination angle of said optical filter member, said arcuate coils being provided on an inner wall of said cylindrical yoke, and driven by a control signal;

said rotating member being supported at only one end by a bearing, said bearing being positioned between said rotating member and an inner wall of said cylindrical yoke; and said arcuate control coils are divided into first to third sections, said first section being a neutral coil, and said second and third sections being drive coils, such that said neutral coil and said drive coils are electrically separated.

* * * * *